US012640129B2

(12) United States Patent
Miyoshi et al.

(10) Patent No.: US 12,640,129 B2
(45) Date of Patent: May 26, 2026

(54) PERFORMANCE OPERATION APPARATUS

(71) Applicant: YAMAHA CORPORATION, Hamamatsu (JP)

(72) Inventors: Shunsuke Miyoshi, Hamamatsu (JP); Michiko Tanoue, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 1024 days.

(21) Appl. No.: 17/746,355

(22) Filed: May 17, 2022

(65) Prior Publication Data

US 2022/0277718 A1 Sep. 1, 2022

Related U.S. Application Data

(63) Continuation of application No. PCT/JP2020/041343, filed on Nov. 5, 2020.

(30) Foreign Application Priority Data

Nov. 20, 2019 (JP) ................................ 2019-209993

(51) Int. Cl.
*G10H 1/34* (2006.01)

(52) U.S. Cl.
CPC ....... *G10H 1/344* (2013.01); *G10H 2220/221* (2013.01); *G10H 2220/275* (2013.01); *G10H 2230/065* (2013.01)

(58) Field of Classification Search
CPC ............. G10H 1/344; G10H 2220/221; G10H 2220/275; G10H 2230/065
See application file for complete search history.

(56) References Cited

U.S. PATENT DOCUMENTS

| | | | |
|---|---|---|---|
| 3,594,488 | A | 7/1971 | Ohno |
| 4,580,478 | A | 4/1986 | Brosh et al. |

(Continued)

FOREIGN PATENT DOCUMENTS

| | | | |
|---|---|---|---|
| DE | 102013004467 | A1 | 9/2014 |
| EP | 1585107 | A2 | 10/2005 |

(Continued)

OTHER PUBLICATIONS

Office Action issued in Japanese Appln. No. 2023-131255 mailed on Nov. 14, 2023. English machine translation provided.

(Continued)

*Primary Examiner* — Jianchun Qin
(74) *Attorney, Agent, or Firm* — ROSSI, KIMMS & McDOWELL LLP

(57) ABSTRACT

A performance operation apparatus includes a distance sensor, an operating element and a holding portion. The distance sensor includes a first substrate and a second substrate and is configured to measure a distance between the first substrate and the second substrate. A conductor is arranged in each of the first substrate and the second substrate. The operating element is operable by an operator. The holding portion holds the first substrate between the operating element and the second substrate and is configured to move with the operating element integrally. Alternatively, a performance operation apparatus includes a distance sensor, an operating element, a first member and a holding portion. The first member is interlocked with the operating element. The holding portion holds the first substrate between the first member and the second substrate and is configured to move with the first member integrally.

13 Claims, 21 Drawing Sheets

(56) References Cited

U.S. PATENT DOCUMENTS

| | | | | |
|---|---|---|---|---|
| 5,187,315 | A | 2/1993 | Muramatsu et al. | |
| 11,657,789 | B2 | 5/2023 | Clark et al. | |
| 2018/0247628 | A1* | 8/2018 | Tanoue | G10H 1/344 |
| 2020/0027432 | A1 | 1/2020 | Yamamoto | |
| 2020/0320966 | A1* | 10/2020 | Clark | H03K 17/972 |

FOREIGN PATENT DOCUMENTS

| | | | |
|---|---|---|---|
| EP | 4064273 | A1 | 9/2022 |
| JP | H02111199 | U | 9/1990 |
| JP | H02293796 | A | 12/1990 |
| JP | H11175067 | A | 7/1999 |
| JP | 2008026217 | A | 2/2008 |
| JP | 2008176164 | A | 7/2008 |
| WO | 2018173923 | A1 | 9/2018 |
| WO | 2019122867 | A1 | 6/2019 |
| WO | 2021100475 | A1 | 5/2021 |

OTHER PUBLICATIONS

Extended European Search Report issued in European Appln. No. 20890155.3, mailed Dec. 1, 2023.
Office Action issued in Japanese Appln. No. 2024-059523, mailed on Jun. 25, 2024. English machine translation provided.
English translation of Written Opinion issued in Intl. Appln. No. PCT/JP2020/041343 mailed Jan. 12, 2021, previously cited in IDS filed May 17, 2022.
Office Action issued in Chinese Appln. No. 202080078240.7, dated Jan. 17, 2025. English machine translation provided.
Office Action issued in Chinese Appln. No. 202080078240.7 mailed Aug. 24, 2025. English machine translation provided.
International Search Report issued in Intl. Appln. No. PCT/JP2020/041343 mailed Jan. 12, 2021. English translation provided.
Written Opinion issued in Intl. Appln. No. PCT/JP2020/041343 mailed Jan. 12, 2021.
Communication Pursuant to Article 94(3) EPC issued in European Appln. No. 20 890 155.3 mailed Sep. 23, 2025.

* cited by examiner

PERFORMANCE OPERATION APPARATUS

CROSS REFERENCE TO RELATED APPLICATIONS

This application is a Continuation of International Patent Application No. PCT/JP2020/041343, filed on Nov. 5, 2020, which claims the benefit of priority to Japanese Patent Application No. 2019-209993, filed on Nov. 20, 2019, the entire contents of which are incorporated herein by reference.

FIELD

The present disclosure relates to a performance operation apparatus.

BACKGROUND

In an electronic keyboard instrument or the like, when a depression of a key is detected, a sound signal is generated based on the detected result. The detection of the key depression is realized by a contact type sensor or a non-contact type sensor. Since such the non-contact sensor also includes a sensor that can be used as a distance sensor, it is possible to continuously measure the pressing amount of the key. As a result, the movement of the key is accurately reflected in sound generation, and it is also possible to perform an after-touch detection.

The non-contact type sensor includes, for example, an optical sensor. The optical sensor is affected by light entering from the exterior or dirt compared with a magnetic induction type sensor. For example, in an electronic keyboard instrument, grease is used in a movable portion. A light sensor may become dirty due to scattering of the grease. Also, such the sensor may be used in an acoustic piano or the like equipped with a sound source. In the case of an acoustic piano, a part of a casing (e.g., a roof board) may be opened when playing and may be affected by external light.

For example, a magnetic induction type sensor which is a non-contact type sensor is not affected by such an influence (e.g., U.S. Pat. No. 4,580,478).

SUMMARY

According to an embodiment of the present disclosure, a performance operation apparatus including a distance sensor, an operating element and a holding portion is provided. The distance sensor includes a first substrate and a second substrate arranged with a conductor, respectively, and measures a distance between the first substrate and the second substrate. The operating element is operable by a user. The holding portion holds the first substrate between the operating element and the second substrate and moves integrally with the operating element.

According to an embodiment of the present disclosure, a performance operation apparatus including a distance sensor, an operating element and a holding portion is provided. The distance sensor includes a first substrate and a second substrate arranged with a conductor, respectively, and measures a distance between the first substrate and the second substrate. The operating element is operable by a user. A first member is interlocked with the operating element. The holding portion holds the first substrate between the first member and the second substrate and moves integrally with the first member.

The operating element and the holding portion may be the same material.

The first member and the holding portion may be the same material.

The first member includes an elastically deformable part, and the distance between the first substrate and the second substrate may vary by elastically deformation of the first substrate in accordance with a force from the operating element. In this case, the first member may receive the force from the operating element either directly or indirectly via another member.

The holding portion may removably hold the first substrate.

The holding portion may include an elastic body, the holding portion may hold the first substrate when the elastic body is in a first state, and the holding portion may release the first substrate when the elastic body is in a second state that is elastically deformed more than in the first state.

The holding portion may include a first plate portion and a second plate portion, a position of the first plate portion and a position of the second plate portion are changeable, the holding portion holds the first substrate in the case where the holding portion is in a first state in which the first plate portion and the second plate portion sandwich the first substrate, and the holding portion releases the first substrate in the case where the holding portion is in a second state in which the first plate portion and the second plate portion are further apart than in the first state.

DESCRIPTION OF EMBODIMENTS

Figure 1:
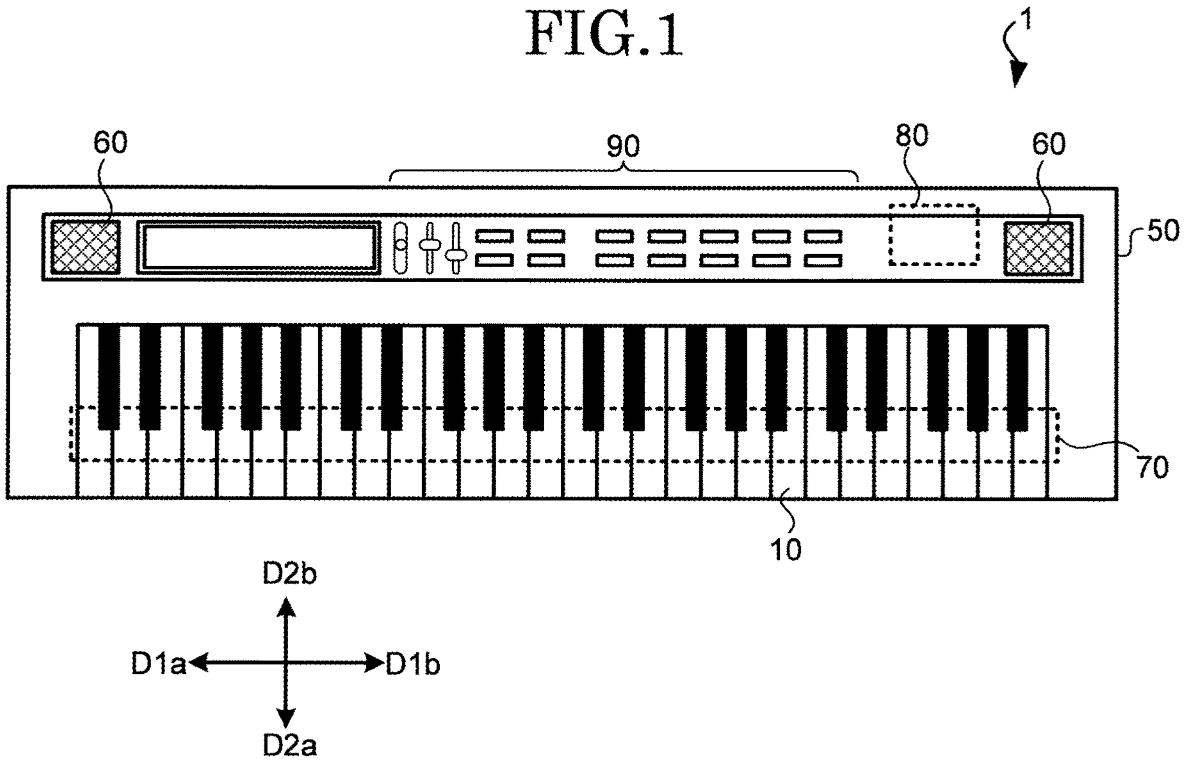
FIG. 1 is a diagram explaining a keyboard apparatus in a first embodiment of the present disclosure.

Hereinafter, a keyboard apparatus in an embodiment of the present disclosure will be described in detail with reference to the drawings. The following embodiments are examples of embodiments of the present disclosure, and the present disclosure should not be construed as being limited to these embodiments. In addition, in the drawings referred to in the present embodiment, the same portions or portions having similar functions are denoted by the same symbols or similar symbols (denoted by A, B, etc. after numerals), and a repetitive description thereof may be omitted. Dimensional ratios in the drawings may differ from actual ratios for convenience of description, or some of the configurations may be omitted from the drawings.

The magnetic induction type sensor is a non-contact type. Therefore, since one substrate on which a coil is arranged needs to be attached to a portion that moves with the depression of a key, it is attached corresponding to each key. Since many keys are used in a keyboard instrument, it is required to efficiently attach the substrate to the keys in a manufacturing process of the keyboard instrument.

One object of the present disclosure is to facilitate the manufacturing process of a performance operation apparatus using the magnetic induction type sensor.

First Embodiment

In the first embodiment, a keyboard apparatus used as an electronic keyboard instrument will be described. According to this keyboard apparatus, the keypress operation can be detected by a magnetic induction type sensor. For example, the keypress operation is detected as a position of the key or as a posture of the key to be moved by the keypress. Hereinafter, the keyboard apparatus will be described in detail.

[1. Summary of Keyboard Apparatus]

FIG. 1 is a diagram explaining a keyboard apparatus according to a first embodiment of the present disclosure. A keyboard apparatus 1 is an electronic keyboard instrument. In this example, the keyboard apparatus 1 is an electronic piano. The keyboard apparatus 1 includes a key 10, a casing 50, a speaker 60, a sound source unit 80 and an operation unit 90. In the following description, for convenience of description, a side with respect to the keyboard apparatus 1 where a player is present (a side on which the key 10 is present with respect to the casing 50) is defined as a front side, and a side opposite to the player is defined as a back side. Left, right, and up and down are also defined as directions when viewed from the player.

A plurality of keys 10 is arranged side by side in one direction. Here, a scale direction in which the plurality of keys 10 is arranged is referred to as a left-right direction D1. In the following description, when left and right are distinguished, the left direction is referred to as D1*a* and the right direction is referred to as D1*b*. A direction perpendicular to the left-right direction D1 is referred to as front-back direction D2. When the keyboard apparatus 1 is viewed from above, the longitudinal direction of the key 10 is the same as the front-back direction D2. In the following description, when distinguishing the front and back, the front direction is referred to as D2*a*, and the back direction is referred to as D2*b*. A direction perpendicular to both the left-right direction D1 and the front-back direction D2 is referred to as vertical direction D3 (see FIG. 2). The vertical direction D3 generally corresponds to a vertical direction when the keyboard apparatus 1 is placed flat. That is, when the keyboard apparatus 1 is placed horizontally, the left-right direction D1 and the front-back direction D2 are directions in the horizontal plane. In the following description, the upward direction is referred to as D3*a* and the downward direction is referred to as D3*b* when distinguishing up and down.

The key 10 can rotate with respect to the casing 50. A state in which the longitudinal direction of the key 10 coincides with the longitudinal direction of the front-back direction D2 is included in the rotation range of the key 10. The speaker 60, a keypress amount measuring unit 70, the sound source unit 80 and the operation unit 90 are arranged in the casing 50. When the player operates the key 10, a sound is generated from the speaker 60 by a sound generation function of the keyboard apparatus 1. The operation unit 90 is a device such as an operation button, a touch sensor and a slider, and receives an instruction for changing the type of sound (tone) and volume of the sound to be generated, and outputs a signal corresponding to the input operation to the sound source unit 80. In addition, the keyboard apparatus 1 may include an interface for inputting and outputting signals to and from an external device. Examples of the interface include a terminal for outputting a sound signal to an external device, and a cable connecting terminal for transmitting and receiving MIDI data, and the like.

The keypress amount measuring unit 70 includes a magnetic induction type sensor arranged for each of the plurality of keys 10. Each of the sensors corresponding to each key 10 detects a position (pressing amount) in a rotation range of the key 10. The keypress amount measuring unit 70 outputs key information specifying any of the plurality of keys 10 and pressing amount information corresponding to the pressing amount of the specified key 10 to the sound source unit 80. The pressing amount information may indicate a value of the pressing amount itself of the key 10, or it may be a value calculated from the pressing amount, such as a speed calculated from a change in the pressing amount, or may be information obtained by combining these. The combination of the keypress amount measuring unit 70 and the key 10 is an example of an input device. The detailed configuration of the keypress amount measuring unit 70 will be described later.

The sound source unit 80 is a signal processing circuit for generating a sound signal according to a performance operation to the key 10. Specifically, the sound source unit 80 generates a sound signal based on the information output from the keypress amount measuring unit 70, and outputs the generated sound signal to the speaker 60. The speaker 60 generates a sound corresponding to the sound signal by amplifying and outputting the sound signal output from the sound source unit 80.

[2. Internal Structure of Keyboard Apparatus 1]

Next, an internal structure of the keyboard apparatus 1 will be described. Here, an explanation is provided with reference to FIG. 2 and FIG. 3 schematically showing a cross-section when cutting the keyboard apparatus 1 in a plane having a left-right direction D1 in the normal line (plane including the front-back direction D2 and the vertical direction D3).

Figure 2:
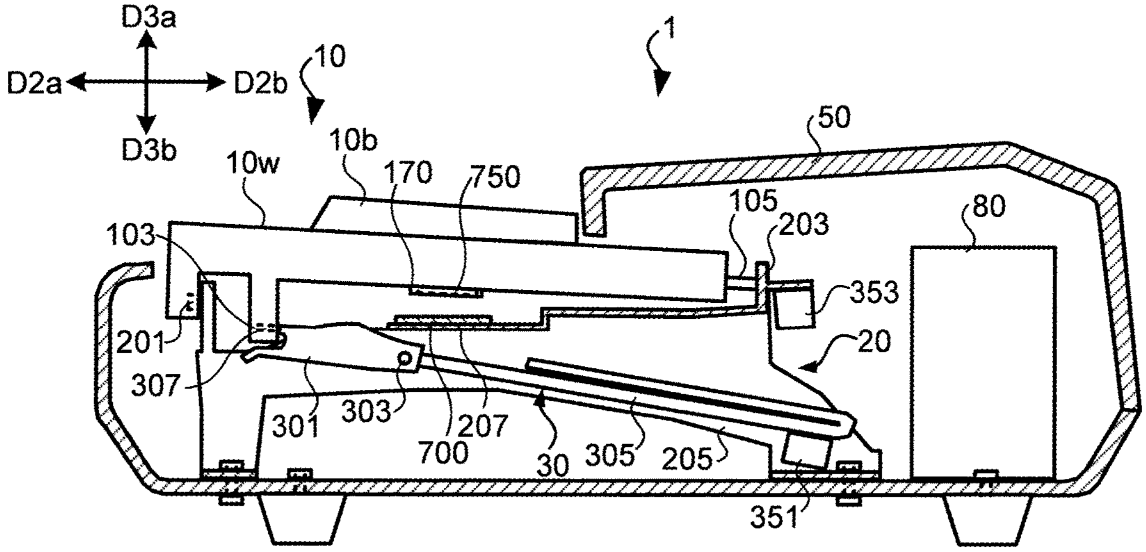
FIG. 2 is a diagram explaining an internal structure of the keyboard apparatus (when a key is released) in the first embodiment of the present disclosure.
Figure 3:
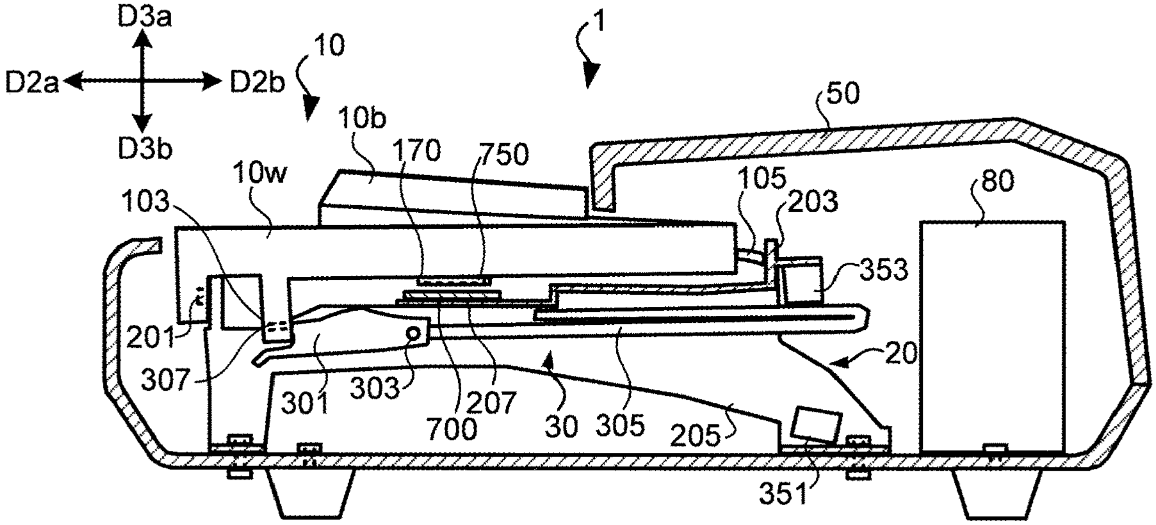
FIG. 3 is a diagram explaining an internal structure of the keyboard apparatus (when a white key is depressed) in the first embodiment of the present disclosure.

FIG. 2 is a diagram explaining an internal structure of the keyboard apparatus in the first embodiment of the present disclosure. FIG. 3 is a diagram explaining an internal structure of the keyboard apparatus (when a white key is depressed) in the first embodiment of the present disclosure. Among the keys 10, a configuration corresponding to a white key 10*w* is shown in the diagram. Since a configuration corresponding to a black key 10*b* is the same as the configuration corresponding to the white key 10*w*, only the position of the black key 10*b* is shown, and other configurations are omitted.

A frame 20 is fixed to the casing 50 and supports the plurality of keys 10 arranged in the left-right direction D1. In this example, the frame 20 is formed of a resin material. The frame 20 includes a key guide portion 201, a key support portion 203, the rib portion 205 and a substrate holding portion 207.

The key guide portion 201 restricts the key 10 from moving in the left-right direction D1 by a member that slides with the key 10 below the front end portion of the key 10. The key support portion 203 supports an elastic portion 105 arranged at the rear end portion of the key 10. When the elastic portion 105 is deformed in the vertical direction, a free end side of the key 10 rotates with respect to the key support portion 203. In this case, since the key 10 is restricted from moving in the left-right direction D1 by the key guide portion 201, the key 10 rotates with respect to the left-right direction D1 as a rotation axis. The rib portion 205 is a plate-shaped member having a plane including the front-back direction D2 and the vertical direction D3 (surface having a left-right direction D1 in the normal line). A plurality of rib portions 205 is arranged side by side in the left-right direction D1. Each of the plurality of rib portions 205 is connected to the key guide portion 201, the key support portion 203, and the substrate holding portion 207.

The substrate holding portion 207 is a plate-shaped member for holding an active circuit substrate 700. In this example, the active circuit substrate 700 is arranged in the upper surface side (key 10 side) of the substrate holding portion 207. A substrate holder 170 is fixed to the lower surface side (the substrate holding portion 207 side) of the key 10. The substrate holder 170 (holding portion) holds a passive circuit substrate 750 as described below.

The active circuit substrate 700 and the passive circuit substrate 750 are, as will be described later, elements constituting the magnetic induction type sensor, which are components included in the keypress amount measuring unit 70. The passive circuit substrate 750 is provided corresponding to each key 10. In this example, although the active circuit substrate 700 is provided corresponding to the plurality of keys 10, it may be provided corresponding to each key 10.

A loaded portion 30 (first member) is arranged corresponding to each key 10. The loaded portion 30 and the key 10 are interlocked by being coupled to each other at a key connecting portion 301 (sliding portion 307) of the loaded portion 30. The loaded portion 30 includes the key connecting portion 301, a bearing 303, and a weight portion 305. The bearing 303 is provided corresponding to a shaft portion provided on the frame 20. The key connecting portion 301 is arranged on a side opposite to the weight portion 305 with respect to the bearing 303. The sliding portion 307 provided at one end of the key connecting portion 301 slides against a load connecting portion 103 provided below the key 10. The loaded portion 30 has a center of gravity closer to the weight portion 305 side than the bearing 303. Therefore, when the key 10 is not depressed, the weight portion 305 is placed on a lower stopper 351 by the loaded portion 30, and the key 10 is held at a rest position (corresponding to when a key is released). The lower stopper 351 and an upper stopper 353 are supported by the frame 20.

When the key 10 is depressed in the state in FIG. 2, as shown in FIG. 3, the loaded portion 30 rotates with respect to the bearing 303 and interlocks with the rotation of the key 10. When the loaded portion 30 rotates, the weight portion 305 moves upward and collides with the upper stopper 353, and further movement is restricted. In this case, as shown in FIG. 3, the active circuit substrate 700 approaches the passive circuit substrate 750. The pressing amount information output by the keypress amount measuring unit 70 described above is information corresponding to a distance between the active circuit substrate 700 and the passive circuit substrate 750 (i.e., the relative positional relationship between the active circuit substrate 700 and the passive circuit substrate 750). The keyboard apparatus 1 may not be provided with the loaded portion 30. In this case, a configuration for regulating a pressing range of the key 10 may be provided.

[3. Structure of Keypress Amount Measuring Unit 70]

The keypress amount measuring unit 70 includes the active circuit substrate 700 and the passive circuit substrate 750 as described above. The active circuit substrate 700 includes a coil (hereinafter referred to as an active coil) for forming a magnetic field by the supplied power. When the passive circuit substrate 750 including the coil (hereinafter, referred to as a passive coil) moves in the magnetic field, an active circuit 770 (see FIG. 4) generates anti-resonance according to the position of the passive coil by magnetic coupling. That is, the circuit characteristics of the active circuit 770 change, and the output of the signal obtained from the active circuit substrate 700 changes. Therefore, the distance between the active circuit substrate 700 and the passive circuit substrate 750 can be measured by the signal obtained from the active circuit substrate 700. As described above, the keypress amount measuring unit 70 includes a distance sensor. Hereinafter, each configuration of the keypress amount measuring unit 70 will be described in detail.

[3-1. Structure of Active Circuit Substrate 700]

Figure 4:
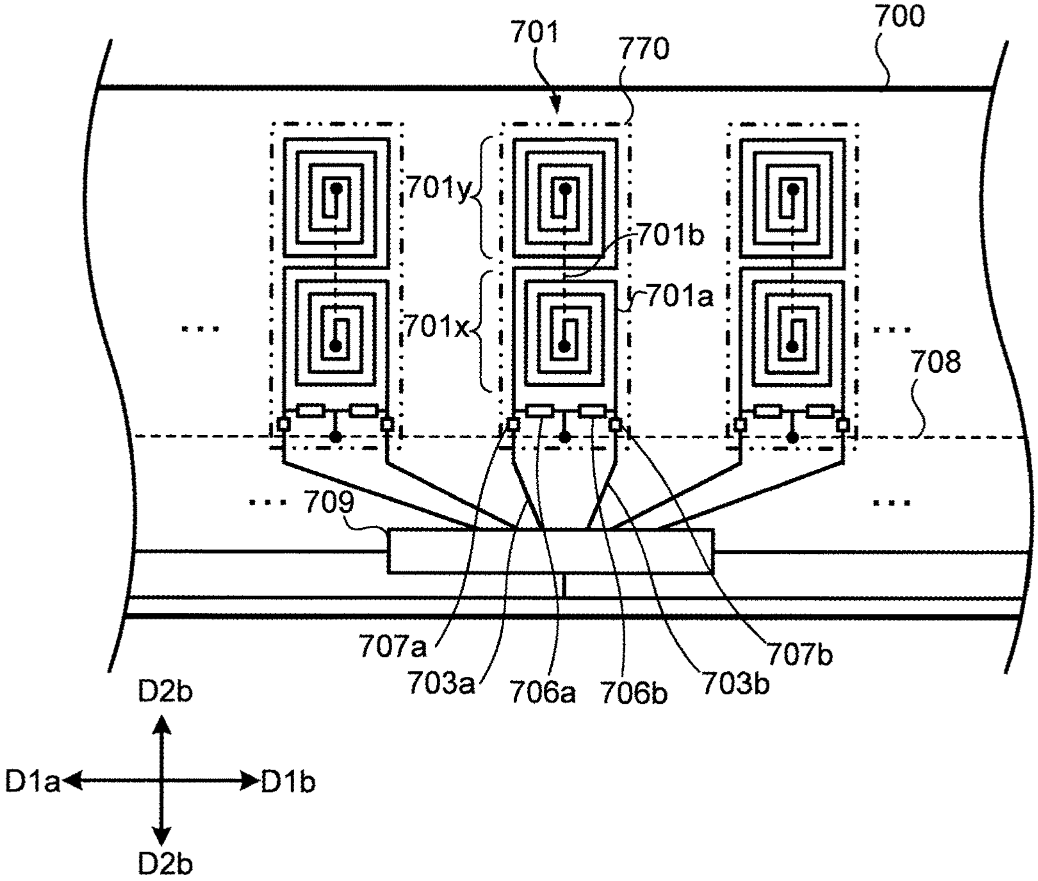
FIG. 4 is a diagram explaining an active circuit substrate in the first embodiment of the present disclosure.

FIG. 4 is a diagram explaining an active circuit substrate according to the first embodiment of the present disclosure. The active circuit substrate 700 is a printed board including a plurality of active circuits 770, a multiplexer 709 and various wirings (a clock signal line, a select signal line, an input signal line, an output signal line, etc. in addition to a ground wiring 708). Also, the active circuit substrate 700 includes a signal processing circuit (not shown). Each of the plurality of active circuits 770 is provided corresponding to each key 10. Two wirings connecting the active circuit 770 and the multiplexer 709 correspond to a signal input portion 703*a* and a signal output portion 703*b*.

The active circuit 770 includes an active coil 701 (conductor or conductive circuit), capacitors 706*a*, 706*b*, and resistors 707*a*, 707*b*. The active coil 701 is formed on the substrate and includes a wiring 701*a* formed on the upper surface side (the key 10 side) of the substrate and a wiring 701*b* provided on the lower surface side (the substrate holding portion 207 side) of the substrate. In FIG. 4, the configuration arranged on the lower surface side of the substrate is shown by a dashed line. The wiring 701*a* and the wiring 701*b* connected to each other form the active coil 701 in which two coils (a first coil 701*x* and a second coil 701*y*) are connected in series.

The first coil 701*x* and the second coil 701*y* are arranged side by side along the front-back direction D2, and a winding direction of the first coil 701*x* is opposite to a winding direction of the second coil 701*y*. Here, the fact that the winding directions are opposite does not mean that the wirings are wound in opposite directions structurally, but are wound so that the current flows in opposite directions to each other when a power is supplied to the circuit by both coils. The same structure is applied to other embodiments, modifications, and the like described below. Therefore, a magnetic flux formed by the active coil 701 is formed to pass through the second coil 701*y* immediately after exiting from the first coil 701*x*.

The capacitors 706*a* and 706*b* are connected in series between both ends of the active coil 701. The ground wiring 708 is connected between the capacitor 706*a* and the capacitor 706*b*. The ground wiring 708 is provided commonly for each active circuit 770. The resistor 707*a* is connected between the capacitor 706*a* and the signal input portion 703*a*. The resistor 707*b* is connected between the capacitor 706*b* and the signal output portion 703*b*.

When an AC signal is input to the signal input portion 703*a* via the multiplexer 709, the active coil 701 forms a magnetic field corresponding to the input signal, and the active coil 701 and a passive coil 751 are magnetically coupled to each other, thereby modulating a signal output from the signal output portion 703*b*. The modulated signal is output to a signal processing circuit (not shown) via the multiplexer 709 and converted into pressing amount information. The signal processing circuit outputs key information and the pressing amount information of the key 10 corresponding to the signal obtained by the multiplexer 709.

[3-2. Structure of Passive Circuit Substrate 750]

Figure 5:
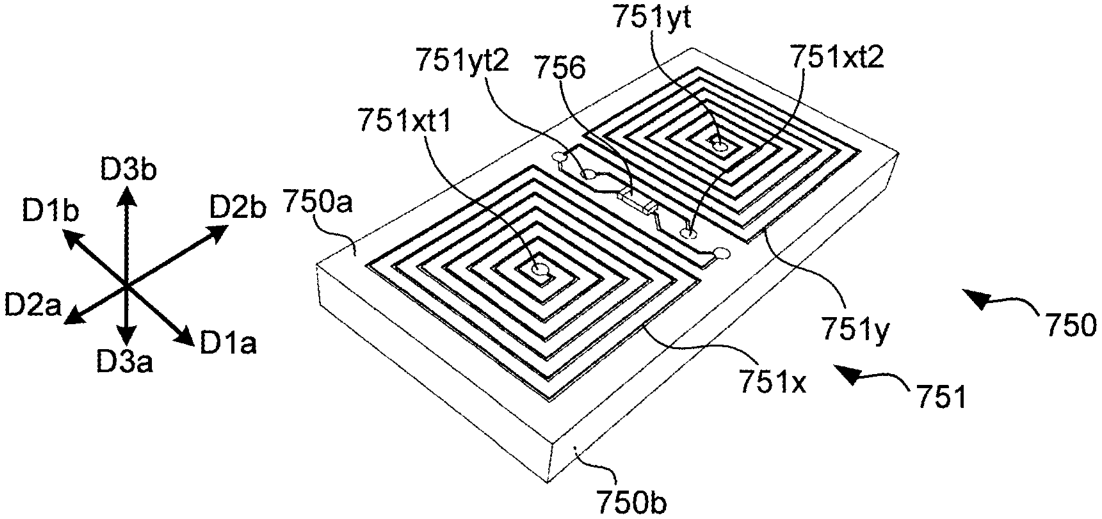
FIG. 5 is a diagram explaining a passive circuit substrate in the first embodiment of the present disclosure.

FIG. 5 is a diagram explaining a passive circuit substrate according to the first embodiment of the present disclosure. A surface 750*a* of the passive circuit substrate 750 shown in FIG. 5 is a surface facing the downward direction D3*b* in FIG. 2. A surface 750*b* of the passive circuit substrate 750 is a surface facing the upward direction D3*a*. The passive circuit substrate 750 is a printed board that includes the passive coil 751 (conductor or conductive circuit) and a capacitor 756. The passive coil 751 is formed on the substrate, and includes two coils 751*x* and 751*y* whose winding directions are opposite to each other, similar to the active coil 701. The coil 751*x* and the coil 751*y* are connected via holes 751*xt*1, 751*xt*2, 751*yt*1, and 751*yt*2 that penetrate from the surface 750*a* to the surface 750*b*. Here, the fact that the winding directions are opposite does not mean that the wirings are wound in opposite directions structurally, but are wound so that the current flows in opposite directions to each other when induced currents are generated in both circuits. The same structure is applied to other embodiments, modifications, and the like described below. Also, the capacitor 756 is connected in series between both ends of the passive coil 751 (between the coil 751*x* and the coil 751*y*). In this example, the surface of the passive circuit substrate 750 (the surface on which the passive coil 751 is formed) is generally parallel to the upper surface (operating surface) of the key 10. Also, the capacitor 756 is arranged on the surface 750*a*. Unless otherwise specified, the passive circuit substrate in the embodiments described below has the same configuration as the passive circuit substrate 750.

[4. Structure of Substrate Holder 170]

Next, a structure of the substrate holder 170 fixed to the key 10 and holding the passive circuit substrate 750 will be described with reference to FIG. 6 to FIG. 11.

Figure 6:
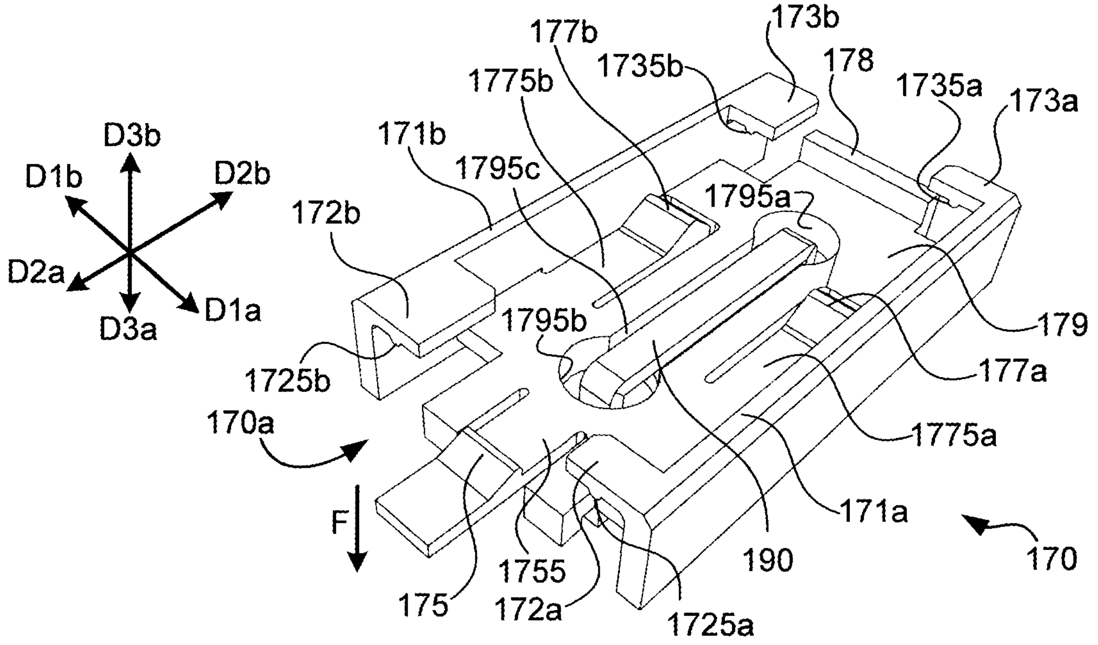
FIG. 6 is a diagram explaining a substrate holder from which a passive circuit substrate is removed in the first embodiment of the present disclosure.
Figure 7:
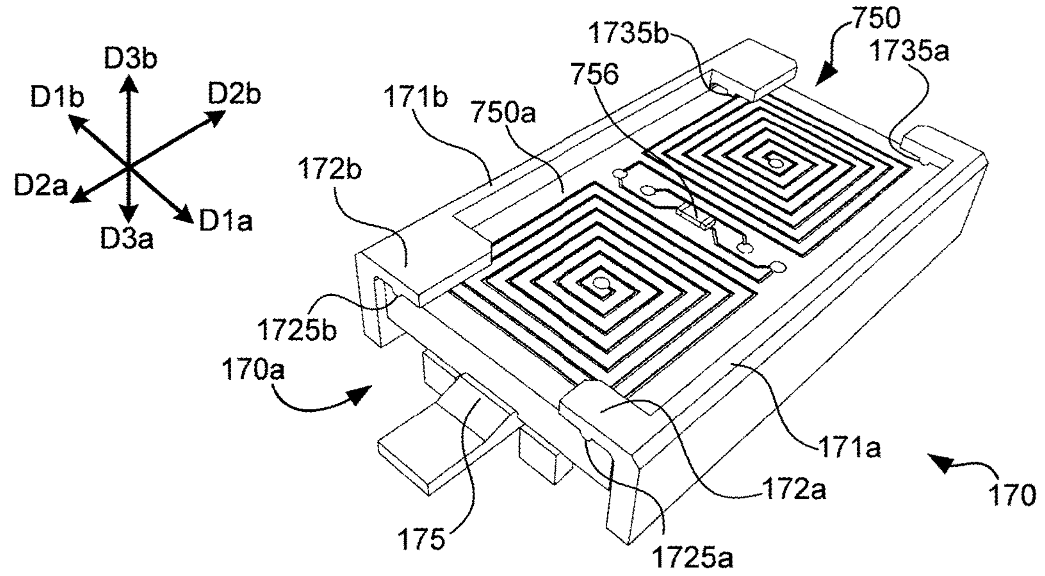
FIG. 7 is a diagram explaining a substrate holder to which a passive circuit substrate is mounted in the first embodiment of the present disclosure.
Figure 8:
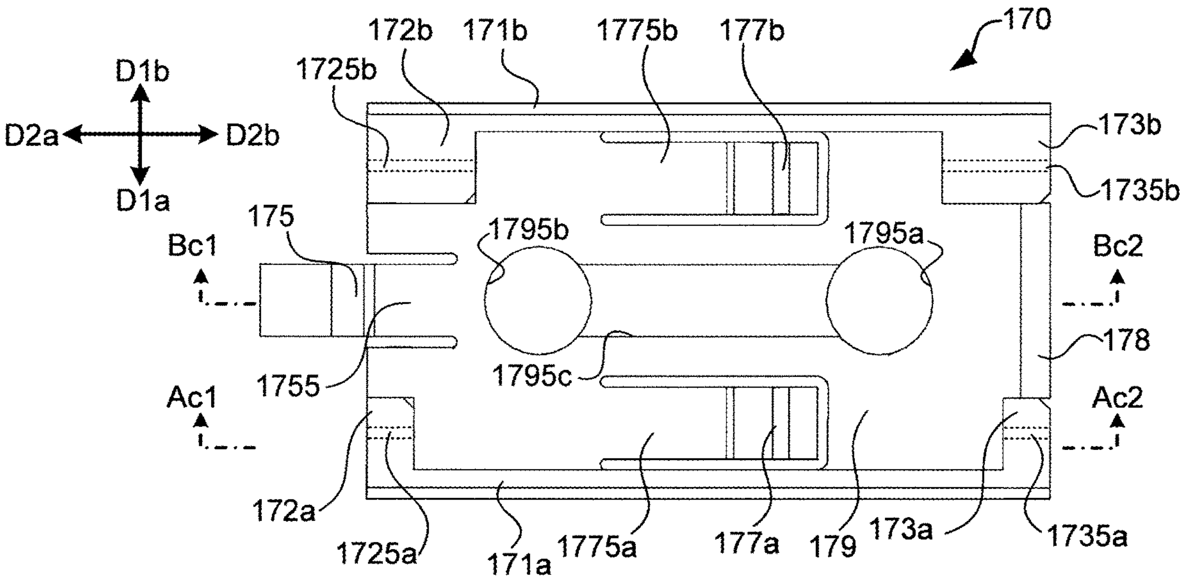
FIG. 8 is a diagram of a substrate holder from which a fixing member is removed when viewed from below in the first embodiment of the present disclosure.
Figure 9:
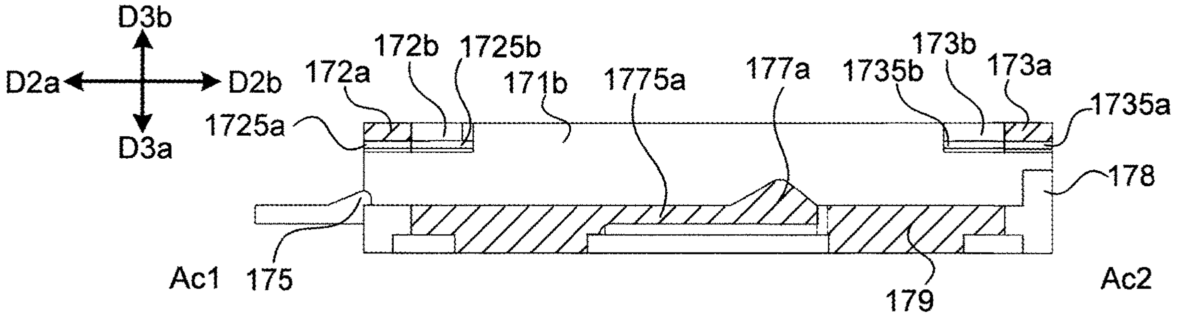
FIG. 9 is a diagram explaining a cross-section (cut line Ac1-Ac2) of a substrate holder in the first embodiment of the present disclosure.
Figure 10:
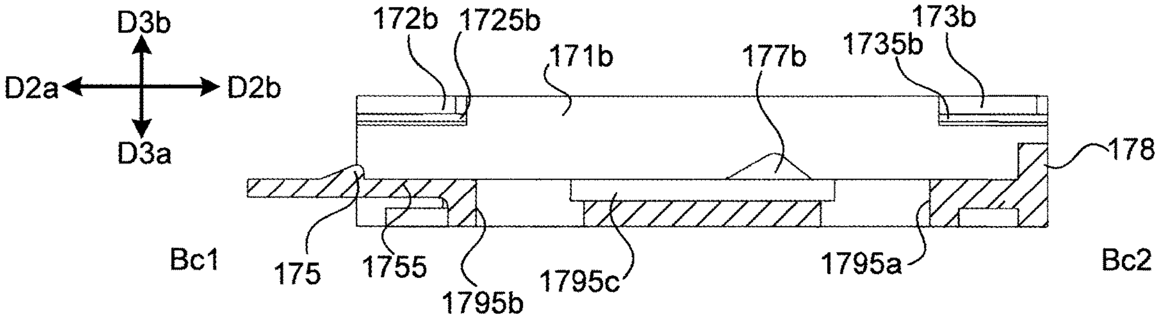
FIG. 10 is a diagram explaining a cross-section (cut line Bc1-Bc2) of a substrate holder in the first embodiment of the present disclosure.
Figure 11:
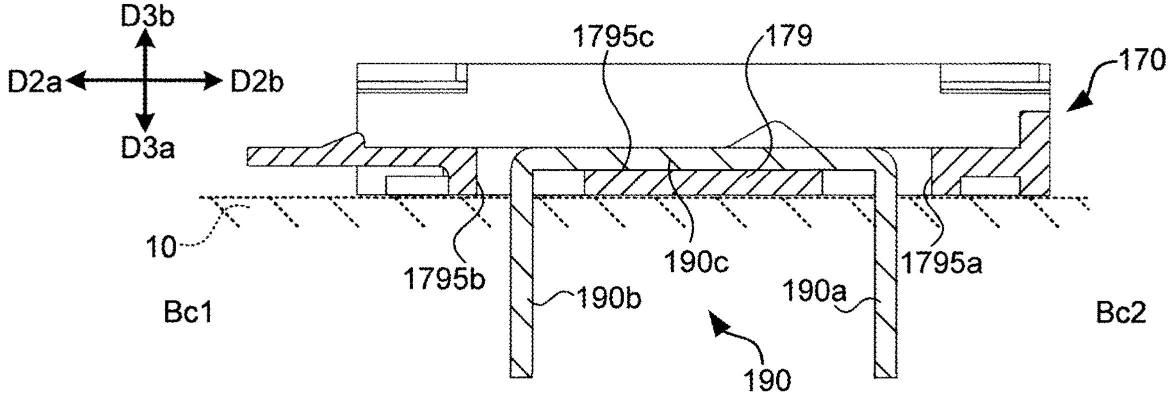
FIG. 11 is a diagram explaining a cross-section (cut line Bc1-Bc2) of a substrate holder to which a fixing member is mounted in the first embodiment of the present disclosure.

FIG. 6 is a diagram explaining a substrate holder from which the passive circuit substrate is removed in the first embodiment of the present disclosure. FIG. 7 is a diagram explaining a substrate holder to which the passive circuit substrate is mounted in the first embodiment of the present disclosure. FIG. 8 is a diagram explaining the substrate holder from which the fixing member is removed when viewed from below in the first embodiment of the present disclosure. FIG. 9 is a diagram explaining a cross-section (cut line Ac1-Ac2) of the substrate holder in the first embodiment of the present disclosure. FIG. 10 is a diagram explaining a cross-section (cut line Bc1-Bc2) of the substrate holder in the first embodiment of the present disclosure. FIG. 11 is a diagram explaining a cross-section (cut line Bc1-Bc2) of the substrate holder to which the fixing member is mounted in the first embodiment of the present disclosure. The key 10 is arranged in the upward direction D3*a* of the substrate holder 170 shown in each of the figures. In other words, the substrate holder 170 is connected to the surface of the key 10 in the downward direction D3*b*.

The key 10 and the substrate holder 170 are fixed by a fixing member 190. The fixing member 190 is formed of a metal. The fixing member 190 is not limited to a metal, and may be formed of other materials such as a resin. This configuration is applied to the following other embodiments and modifications.

In this example, the substrate holder 170 is formed of a resin and manufactured by injection molding. The substrate holder 170 has a partially opened substantially rectangular parallelepiped shape. The reason that a part of the rectangular is opened is due to limitations in the manufacture of injection molding and also to realize the functions of the configurations described below. Also, the manufacturing method of the substrate holder 170 is not limited to injection molding, and may be other manufacturing methods such as cutting. This configuration is applied to the following other embodiments and modifications.

A plate-shaped bottom surface portion 179 is arranged in the upward direction D3*a* (the key 10 side) of the substrate holder 170. A groove 1795*c* is arranged at the center of the bottom surface portion 179. The groove 1795*c* is a portion of the bottom surface portion 179 that is thinned along the front-back direction D2. Through holes 1795*a* and 1795*b* penetrating the bottom surface portion 179 are arranged on both ends of the groove 1795*c* in the front-back direction D2. As shown in FIG. 6 and FIG. 11, the fixing member 190 includes a plate-shaped member 190*c* having a longitudinal shape, and key embedded portions 190*a*, 190*b* bent to the same direction and substantially vertical at both ends in the longitudinal direction of the plate-shaped member 190*c*. The plate-shaped member 190*c* is arranged along the groove 1795*c*, and the key embedded portions 190*a*, 190*b* pass through the through holes 1795*a*, 1795*b*, respectively, and are embedded in the key 10 and fixed to the key 10. The thinned portion of the bottom surface portion 179 in the groove 1795*c* is sandwiched by the plate-shaped member 190*c* and the key 10, thereby the key 10 and the substrate holder 170 are fixed. By fixing the positional relationship between the key 10 and the substrate holder 170, the substrate holder 170 moves integrally with the key 10.

In the left direction D1*a* of the bottom surface portion 179, a raised portion 177*a* is arranged via an elastic portion 1775*a*. The elastic portion 1775*a* functions as an elastic body by being cantilevered by the bottom surface portion 179. The raised portion 177*a* is raised in the downward direction D3*b* with respect to the bottom surface portion 179. The raised portion 177*a* can move in the vertical direction D3 by the elastic portion 1775*a* being elastically deformed. In the left-right direction D1*b* of the bottom surface portion 179, a raised portion 177*b* is arranged via an elastic portion 1775*b*. The elastic portion 1775*b* functions as an elastic body by being cantilevered by the bottom surface portion 179. The raised portion 177*b* is raised in the downward direction D3*b* with respect to the bottom surface portion 179. The raised portion 177*b* can move in the vertical direction D3 by the elastic portion 1775*b* being elastically deformed. In this example, the raised portion 177*a* and the raised portion 177*b* are arranged to sandwich the groove 1795*c*.

A side surface part 171*a* extending in the downward direction D3*b* is arranged on the end portion in the left direction D1*a* of the bottom surface portion 179. A side surface part 171*b* extending in the downward direction D3*b* is arranged on the end portion of the bottom surface portion 179 in the right direction D1*b*. A side surface part 178 extending in the downward direction D3*b* is arranged on the end portion of the bottom surface portion 179 in the back direction D2*b*. The side surface parts 171*a*, 171*b*, and 178 are plate-shaped members including portions substantially perpendicular to the bottom surface portion 179.

Cover parts 172*a* and 173*a* extending in the right direction D1*b* are arranged at the end portion of the side surface part 171*a* in the downward direction D3*b*, and at both ends in the front-back direction, respectively. The cover parts 172*a* and 173*a* are plate-shaped members substantially parallel to the bottom surface portion 179. In the cover part 172*a*, a linear protrusion part 1725*a* is arranged on the surface on the side in the upward direction D3*a* (the surface on the inner side of the substrate holder 170). The linear protrusion part 1725*a* is arranged along the front-back direction D2. In the cover part 173*a*, a linear protrusion part 1735*a* is arranged on the surface on the side in the upward direction D3*a* (the surface on the inner side of the substrate holder 170). The linear protrusion part 1735*a* is arranged along the front-back direction D2.

The cover parts 172*b* and 173*b* extending in the left direction D1*a* are arranged at the end portion of the side surface part 171*b* in the downward direction D3*b*, and at both ends in the front-back direction, respectively. The cover parts 172*b* and 173*b* are plate-shaped members substantially parallel to the bottom surface portion 179. In the cover part 172*b*, a linear protrusion part 1725*b* is arranged on the surface on the side in the upward direction D3*a* (the surface on the inner side of the substrate holder 170). The linear protrusion part 1725*b* is arranged along the front-back direction D2. In the cover part 173*b*, a linear protrusion part

1735*b* is arranged on the surface on the side in the upward direction D3*a* (the surface on the inner side of the substrate holder 170). The linear protrusion part 1735*b* is arranged along the front-back direction D2.

A raised portion 175 is arranged at the end portion in the front direction D2*a* of the bottom surface portion 179 via an elastic portion 1755. The elastic portion 1755 functions as an elastic body by being cantilevered by the bottom surface portion 179. The raised portion 175 is raised in the downward direction D3*b* with respect to the bottom surface portion 179, and the length in front-back direction D2 is shorter toward the downward direction D3*b*. The raised portion 175 includes a portion that is substantially perpendicular to the bottom surface portion 179 on the surface on the side in the back direction D2*b* (the surface on the inner side of the substrate holder 170). When a force F is applied to the raised portion 175 in the upward direction D3*a*, the elastic portion 1755 is elastically deformed and the raised portion 175 moves in the upward direction D3*a*. An opening 170*a* is formed in the front direction D2*a* of the substrate holder 170. Movement of the raised portion 175 in the upward direction D3*a* ensures the opening 170*a* is large enough to insert the passive circuit substrate 750 inside the substrate holder 170.

As the passive circuit substrate 750 is inserted from the opening 170*a* into the substrate holder 170, the passive circuit substrate 750 moves the raised portions 177*a*, 177*b* in the upward direction D3*a*, and finally, the passive circuit substrate 750 contacts the side surface part 178. In this state, the raised portion 175 returns to the original position. In this process, the capacitor 756 arranged in the passive circuit substrate 750 passes between the cover part 172*a* and the cover part 172*b*. Therefore, even if the capacitor 756 protrudes from the surface 750*a*, it does not interfere with the insertion of the passive circuit substrate 750. Also, the raised portion 175 does not have to be completely returned to its original position by being in contact with the end face or edge of the passive circuit substrate 750. That is, although the elastic portion 1755 may continue to be subjected to a force F in the upward direction D3*a* by the passive circuit substrate 750, the position of the raised portion 175 returns at least to the extent that the passive circuit substrate 750 cannot pass through the opening 170*a*.

Regarding the passive circuit substrate 750 housed in the substrate holder 170, the positions of the side surface part 171*a* and the side surface part 171*b* are determined in the left-right direction D1, and the positions of the side surface part 178 and the raised portion 175 are determined in front-back direction D2. The raised portions 177*a* and 177*b* moved by the passive circuit substrate 750 attempt to return to the original positions by the restoring force of the elastic portions 1775*a* and 1775*b*, respectively. Therefore, the raised portions 177*a* and 177*b* apply a force in the downward direction D3*b* to the passive circuit substrate 750 so that the passive circuit substrate 750 is pressed against the linear protrusion parts 1725*a*, 1725*b*, 1735*a*, 1735*b*. As a result, the position of the passive circuit substrate 750 in the vertical direction D3 is determined. In this manner, the passive circuit substrate 750 is held by the substrate holder 170.

Also, even if there is a certain tolerance in the position of the passive circuit substrate 750 in the left-right direction D1 and front-back direction D2, the passive circuit substrate 750 is sandwiched between the vertical direction D3 in the substrate holder 170. Therefore, the passive circuit substrate 750 hardly moves when held inside the substrate holder 170.

On the other hand, in the state where the passive circuit substrate 750 is held by the substrate holder 170, the opening 170*a* is expanded by applying a force F to elastically deform the elastic portion 1755 to move the raised portion 175 in the upward direction D3*a*. As a result, the retention of the passive circuit substrate 750 by the substrate holder 170 is released. As described above, in the state (second state) where the elastic portion 1755 is further elastically deformed than in the state (first state) of the elastic portion 1755 when the passive circuit substrate 750 is held by the substrate holder 170, the retention of the passive circuit substrate 750 is released. By sliding the passive circuit substrate 750 toward the opening 170*a* in this state, the passive circuit substrate 750 can be removed from the substrate holder 170.

As described above, according to the keyboard apparatus 1 in the first embodiment of the present disclosure, it is possible to measure the pressing amount of the key 10 using the magnetic induction type sensor in the keypress amount measuring unit 70. The passive circuit substrate 750 needs to be provided for each key 10. In this example, the substrate holder 170 fixed to the key 10 may hold or release the passive circuit substrate 750 by elastically deforming the elastic portion 1755, i.e., removably holds the passive circuit substrate 750. Therefore, mounting or removing the passive circuit substrate 750 from the substrate holder 170 can be easily realized, thereby facilitating the manufacturing process or improving maintainability of the keyboard apparatus 1.

Second Embodiment

In the first embodiment, the key 10 and the substrate holder 170 are configured separately, and the positional relationship between the key 10 and the substrate holder 170 is fixed to each other via the fixing member 190. In the second embodiment, a substrate holder 170A formed integrally with the key 10 will be described with reference to FIG. 12 and FIG. 13. In this example, the key 10 and the substrate holder 170A are integrally formed by injection molding and are formed of the same material.

Figure 12:
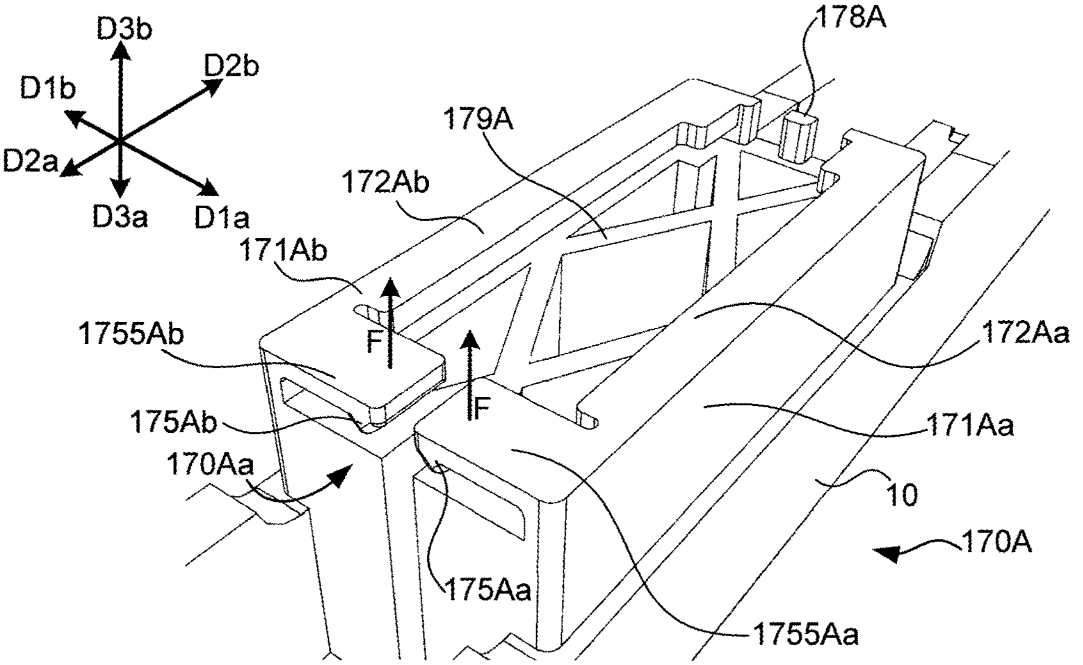
FIG. 12 is a diagram explaining a substrate holder from which a passive circuit substrate is removed in a second embodiment of the present disclosure.
Figure 13:
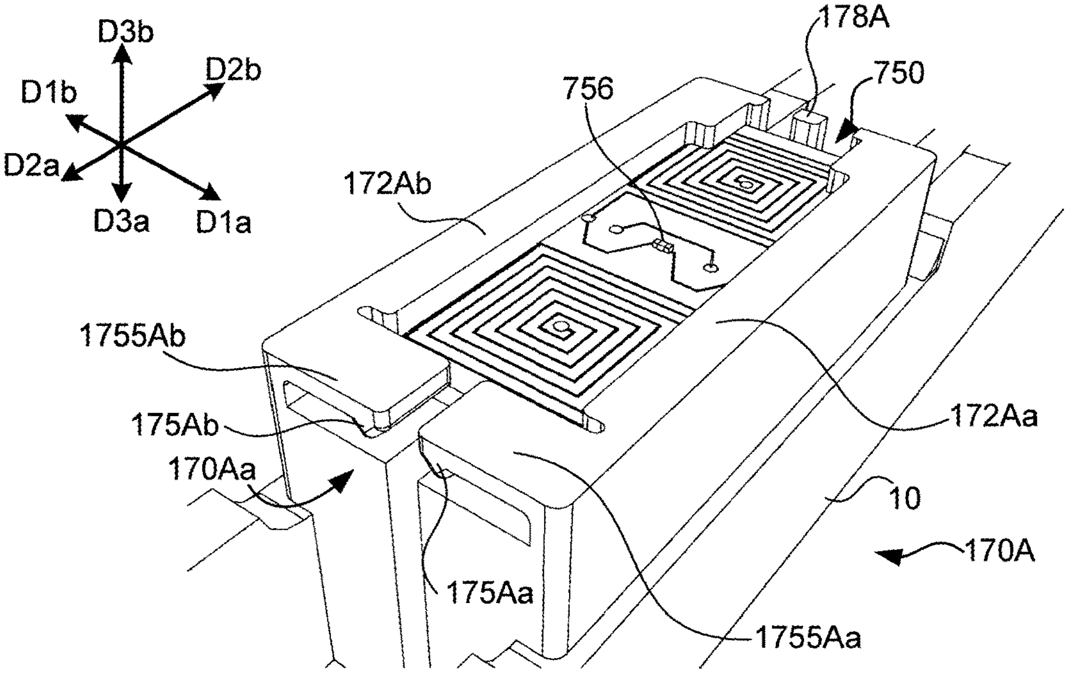
FIG. 13 is a diagram explaining a substrate holder to which a passive circuit substrate is mounted in the second embodiment of the present disclosure.

FIG. 12 is a diagram explaining a substrate holder from which the passive circuit substrate is removed in the second embodiment. FIG. 13 is a diagram explaining a substrate holder to which the passive circuit substrate is mounted in the second embodiment. The substrate holder 170A is continuously configured with the key 10 and includes a configuration similar to the substrate holder 170. Since side surface parts 171Aa, 171Ab, 178A, and cover parts 172Aa, and 172Ab are similar to the corresponding configurations in the substrate holder 170, descriptions thereof are omitted. In the substrate holder 170A, the configuration of an opening 170Aa is different from the opening 170*a* in the substrate holder 170.

A raised portion 175Aa is arranged at the end portion in the front direction D2*a* and the end portion in the upward direction D3*a* of the side surface part 171Aa via an elastic portion 1755Aa extending in the right direction D1*b*. The elastic portion 1755Aa functions as an elastic body by being cantilevered by the side surface 171Aa. The raised portion 175Aa is raised in the upward direction D3*a* with respect to the elastic portion 1755Aa. The raised portion 175Aa includes a portion that is substantially perpendicular to a bottom surface portion 179A on the surface on the side in the back direction D2*b* (the surface on the inner side of the substrate holder 170A). When a force F is applied to the raised portion 175Aa in the downward direction D3*b*, the elastic portion 1755Aa is elastically deformed and the raised portion 175Aa moves in the downward direction D3*b*.

A raised portion 175Ab is arranged at the end portion in the front direction D2*a* and the end portion in the upward direction D3*a* of the side surface part 171Ab via an elastic portion 1755Ab extending in the left direction D1*a*. The elastic portion 1755Ab functions as an elastic body by being cantilevered by the side surface 171Ab. The raised portion 175Ab is raised in the upward direction D3*a* with respect to the elastic portion 1755Ab. The raised portion 175Ab includes a portion that is substantially perpendicular to the bottom surface portion 179A on the surface on the side in the back direction D2*b* (the surface on the inner side of the substrate holder 170A). When a force F is applied to the raised portion 175Ab in the downward direction D3*b*, the elastic portion 1755Ab is elastically deformed and the raised portion 175Ab moves in the downward direction D3*b*.

The opening 170Aa is formed in the front direction D2*a* of the substrate holder 170A. Movement of the raised portions 175Aa and 175Ab in the downward direction D3*b* ensures the opening 170Aa is large enough to insert the passive circuit substrate 750 inside the substrate holder 170A. As the passive circuit substrate 750 is inserted from the opening 170Aa into the substrate holder 170A, the passive circuit substrate 750 contacts the side surface part 178A. In this state, the raised portions 175Aa and 175Ab return to the original positions. In this process, the capacitor 756 arranged in the passive circuit substrate 750 passes between the raised 175Aa and the raised portion 175Ab. The raised portions 175Aa and 175Ab do not have to be completely returned to their original position by being in contact with the end face or edge of the passive circuit substrate 750. That is, although the elastic portions 1755Aa and 1755Ab may continue to be subjected to a force F in the upward direction D3*a* by the passive circuit substrate 750, the positions 175Aa and 175Ab return at least to the extent that the passive circuit substrate 750 cannot pass through the opening 170Aa.

Regarding the passive circuit substrate 750 housed in the substrate holder 170A, the position of the side surface part 171Aa and the side surface part 171Ab are determined in the left-right direction D1, the positions of the side surface part 178A and the raised portions 175Aa, 175Ab are determined in front-back direction D2, and the positions of the bottom surface portion 179A and the cover parts 172Aa, 172Ab are determined in the vertical direction D3. In this manner, the passive circuit substrate 750 is held by the substrate holder 170A. Also, similar to the first embodiment, a configuration corresponding to the elastic portion 1775*a* and the raised portion 177*a* may be provided in the substrate holder 170A. Also, a protrusion part is provided on the surfaces of cover parts 172Aa and 172Ab in the upward direction D3*a*, and a force in the upward direction D3*a* may be applied to the passive circuit substrate 750 from the protrusion part. In this case, this configuration can be realized if the cover parts 172Aa and 172Ab are elastically deformed in the downward direction D3*b* while the passive circuit substrate 750 is held.

By sliding the passive circuit substrate 750 toward the opening 170Aa in the state where the raised portions 175Aa and 175Ab are moved in the downward direction D3*b*, the passive circuit substrate 750 can be removed from the substrate holder 170A. In this manner, the substrate holder 170A removably holds the passive circuit substrate 750.

As described above, in the case where the substrate holder 170A is formed integrally with the key 10, particularly when the key 10 and the substrate holder 170A are formed integrally by injection molding, although parts of shapes are limited by manufacturing limitations, the fixing member 190 in the first embodiment does not need to be present.

Third Embodiment

In the third embodiment, a substrate holder 170B for removably holding the passive circuit substrate 750 by opening and closing the cover will be described with reference to FIG. 14 to FIG. 17.

Figure 14:
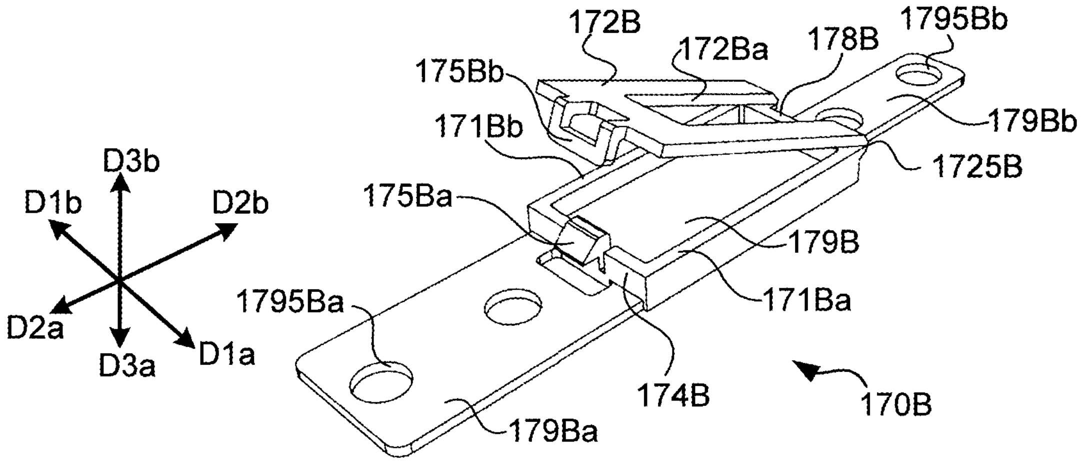
FIG. 14 is a diagram explaining a substrate holder from which a passive circuit substrate is removed in a third embodiment of the present disclosure.
Figure 15:
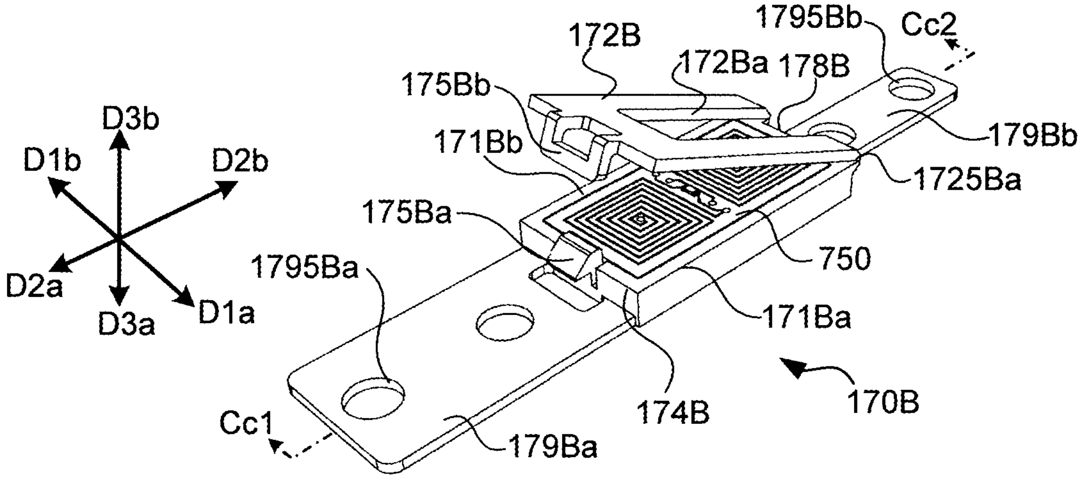
FIG. 15 is a diagram explaining a state in which a passive circuit substrate is arranged in a substrate holder in the third embodiment of the present disclosure.
Figure 16:
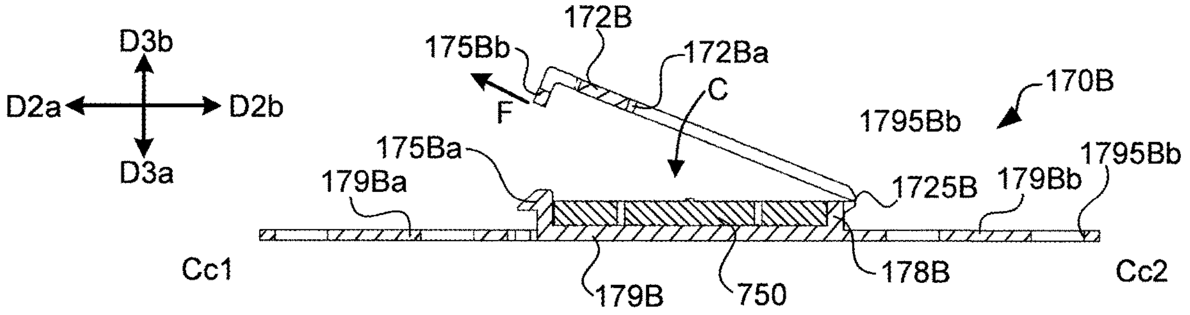
FIG. 16 is a diagram explaining a cross-section (cut line Cc1-Cc2) in the state in which a passive circuit substrate is arranged in a substrate holder in the third embodiment of the present disclosure.
Figure 17:
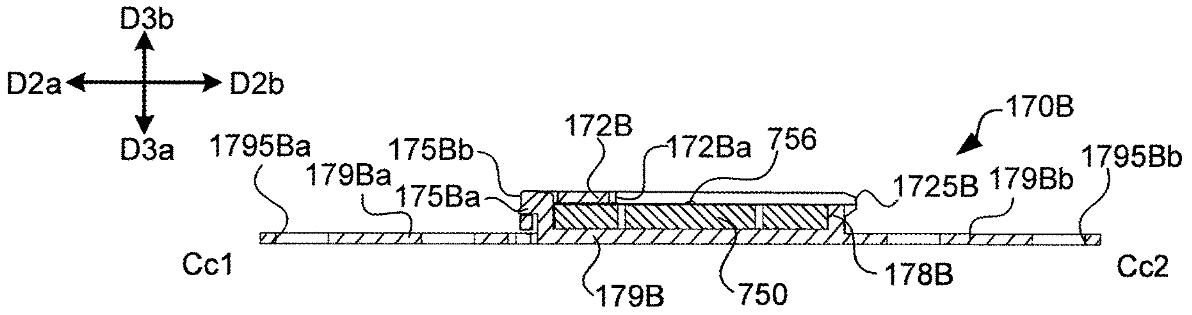
FIG. 17 is a diagram explaining a cross-section in a state in which a passive circuit substrate is mounted on a substrate holder by closing a cover part in FIG. 16.

FIG. 14 is a diagram explaining a substrate holder from which the passive circuit substrate is removed in the third embodiment of the present disclosure. FIG. 15 is a diagram explaining a state where the passive circuit substrate is arranged in the substrate holder in the third embodiment of the present disclosure. FIG. 16 is a diagram explaining a cross-section (cut line Cc1-Cc2) in the state where the passive circuits substrate is arranged in the substrate holder in the third embodiment of the present disclosure. FIG. 17 is a diagram explaining a cross-section in a state where the passive circuit substrate is mounted on the substrate holder by closing the cover part 172*b* in FIG. 16. In this example, the substrate holder 170B is formed of a resin and manufactured by injection molding. The substrate holder 170B has a shape which is partially opened and has a substantially rectangular parallelepiped shape, and a cover structure having one surface which is capable of opening and closing.

A plate-shaped bottom surface portion 179B is arranged in the upward direction D3*a* (the key 10 side) of the substrate holder 170B. A bottom surface portion 179Ba is arranged in the front direction D2*a* of the bottom surface portion 179B, and a bottom surface portion 179Bb is arranged in the back direction D2*b*. The bottom surface portion 179Ba is provided with a through hole 1795Ba. The bottom surface portion 179Bb is provided with a through hole 1795Bb. These through holes 1795Ba and 1795Bb may be used to arrange a fixing member for fixing the substrate holder 170B to the key 10, and may have a function similar to that of the through holes 1795*a* and 1795*b* in the first embodiment, for example.

A side surface part 171Ba is arranged at the end portion in the left direction D1*a* of the bottom surface portion 179B. A side surface part 171Bb is arranged at the end portion in the right direction D1*b* of the bottom surface portion 179B. A side surface part 174B is arranged at the end portion in the front direction D2*a* of the bottom surface portion 179B. A side surface part 178B is arranged at the end portion in the back direction D2*b* of the bottom surface portion 179B. The side surface parts 171Ba, 171Bb, 174B, and 178B are plate-shaped members including a portion that is substantially perpendicular to the bottom surface portion 179. A raised portion 175Ba is arranged on the side surface part 174B. The raised portion 175Ba is raised in the front direction D2*a* with respect to the side surface part 174B. The plate-shaped cover part 172*b* is arranged at the end portion in the downward direction D3*b* of the side surface part 178B via a hinge part 1725B. In the cover part 172*b*, a notch part 172Ba is formed in a substantially central portion. In the end portion of the cover part 172*b*, an engaging part 175Bb is arranged at the end portion opposite to the hinge part 1725B.

The cover part 172B can rotate about the hinge part 1725B with respect to the bottom surface portion 179B. That is, the positional relationship between the cover part 172B and the bottom surface portion 179B can be changed. The passive circuit substrate 750 is arranged on the bottom surface portion 179B in the case where the cover part 172B is opened, and the cover part 172B is moved to a direction C where the cover part 172B is closed. In this case, by the force F being applied in a direction away from the cover part 172B with respect to the engaging part 175Bb, the engaging part 175Bb passes through the raised portion 175Ba, and moves in the upward direction D3*a* side of the raised portion 175Ba. By the cover part 172B being closed in this way, the passive circuit substrate 750 is in a state where it is sandwiched between the two plate-shaped members, i.e., a state sandwiched between the cover part 172B and the bottom surface portion 179B (first state). In this state, the passive circuit substrate 750 is held by the substrate holder 170B. In this case, the capacitor 756 in the passive circuit substrate 750 is prevented from contacting the cover part 172B by the notch part 172Ba.

Regarding the passive circuit substrate 750 housed in the substrate holder 170B, the positions of the side surface part 171Ba and the side surface part 171Bb are determined in the left-right direction D1, the positions of the side surface part 178B and the side surface part 174B are determined in front-back direction D2, and the positions of the bottom surface portion 179B and the cover part 178B are determined in the vertical direction D3. In this manner, the passive circuit substrate 750 is held by the substrate holder 170B. Also, similar to the first embodiment, a configuration corresponding to the elastic portion 1775*a* and the raised portion 177*a* may be provided in the substrate holder 170B. Also, in the state where an elastic body or nonwoven fabric or the like is sandwiched between the cover part 172B and the passive circuit substrate 750, a force in the upward direction D3*a* may be applied from the cover part 172B to the passive circuit substrate 750, and the substrate holder 170B may hold the passive circuit substrate 750 more strongly.

The state where the cover part 172B is opened in the state where the engaging part 175Bb is subjected to a force F, and the cover part 172B and the bottom surface portion 179B are separated (second state) is a state in which the retention of the passive circuit substrate 750 is released. In this manner, the substrate holder 170B removably holds the passive circuit substrate 750.

Fourth Embodiment

In the fourth embodiment, a substrate holder 170C for removably holding the passive circuit substrate 750 by snap-fit will be described with reference to FIG. 18 to FIG. 21.

Figure 18:
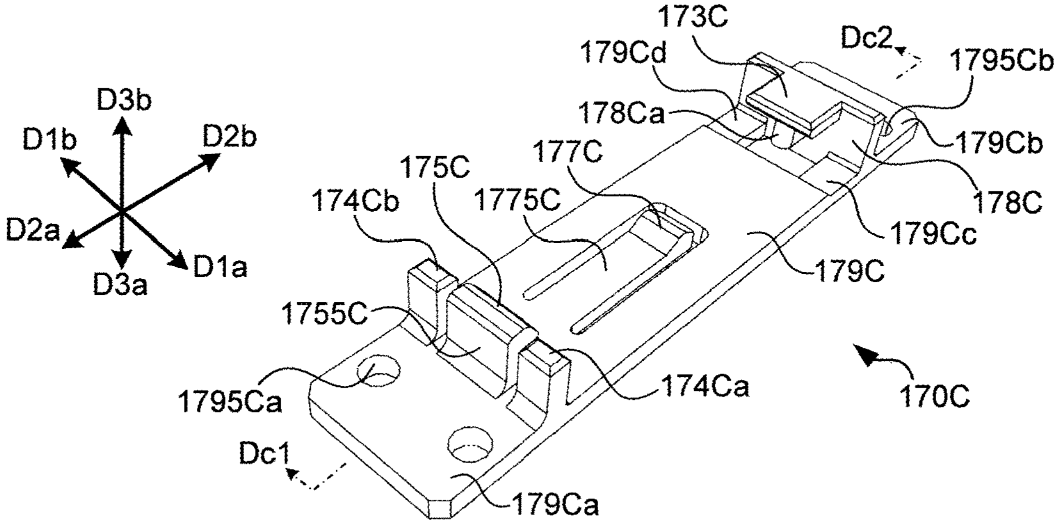
FIG. 18 is a diagram explaining a substrate holder from which a passive circuit substrate is removed in a fourth embodiment of the present disclosure.
Figure 19:
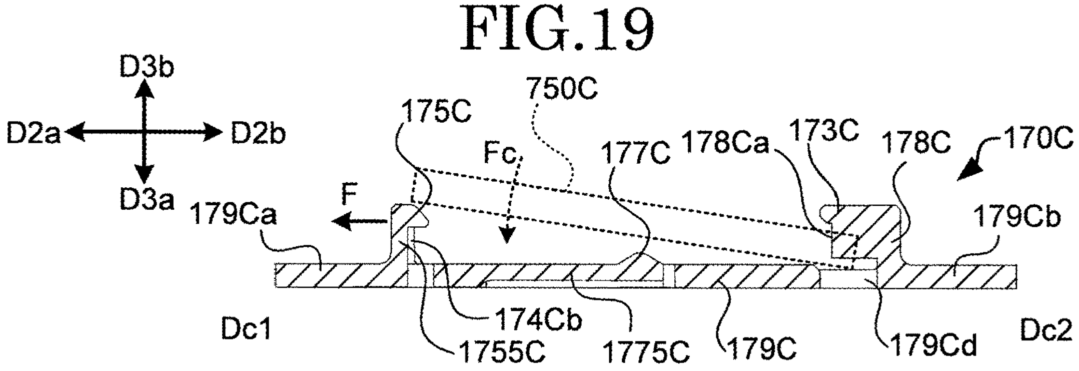
FIG. 19 is a diagram explaining a cross-section (cut line Dc1-Dc2) of a substrate holder in the fourth embodiment of the present disclosure.
Figure 20:
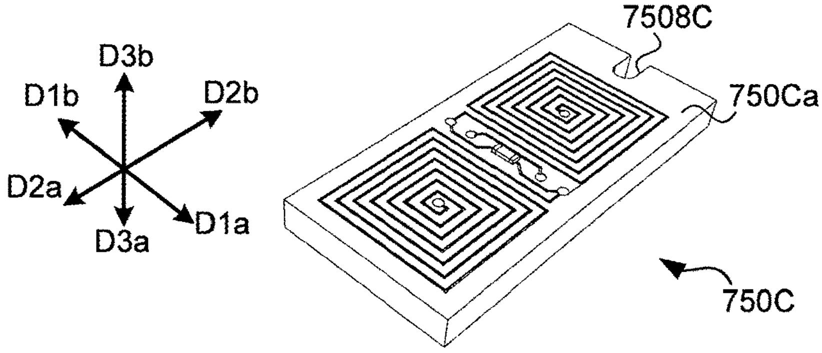
FIG. 20 is a diagram explaining a passive circuit substrate in the fourth embodiment of the present disclosure.
Figure 21:
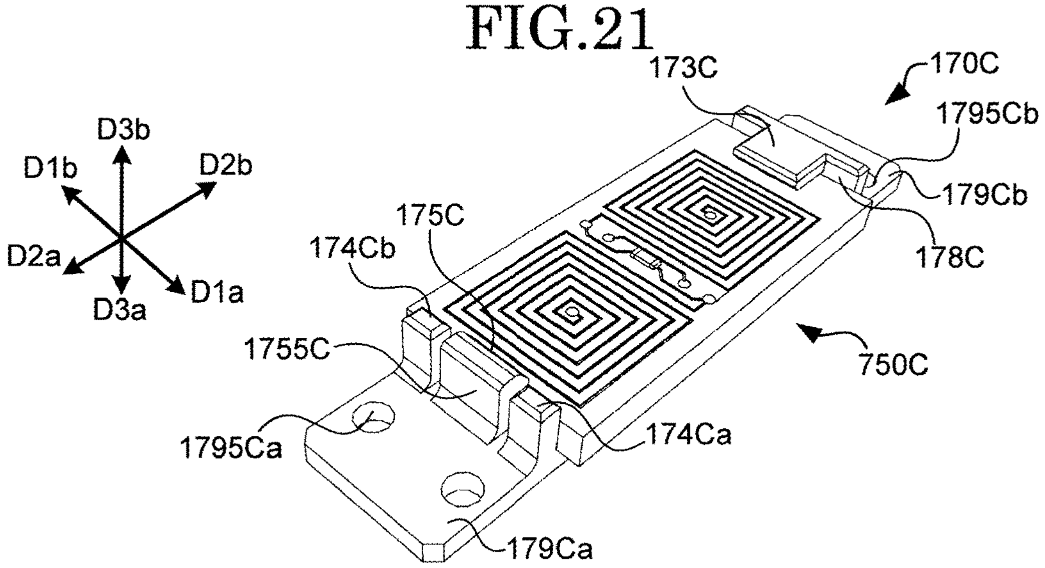
FIG. 21 is a diagram explaining a substrate holder to which a passive circuit substrate is mounted in the fourth embodiment of the present disclosure.

FIG. 18 is a diagram explaining a substrate holder from which the passive circuit substrate is removed in the fourth embodiment of the present disclosure. FIG. 19 is a diagram explaining a cross-section (cut line Dc1-Dc2) of the substrate holder in the fourth embodiment of the present disclosure. FIG. 20 is a diagram explaining a passive circuit substrate in the fourth embodiment of the present disclosure. FIG. 21 is a diagram explaining a substrate holder to which a passive circuit substrate is mounted in the fourth embodiment of the present disclosure. In this example, the substrate holder 170C is formed of a resin and manufactured by injection molding.

A plate-shaped bottom surface portion 179C is arranged in the upward direction (the key 10 side) D3*a* of the substrate holder 170C. A bottom surface portion 179Ca is arranged in the front direction D2*a* of the bottom surface portion 179C, and a bottom surface portion 179Cb is arranged in the back direction D2*b*. The bottom surface portion 179Ca is provided with a through hole 1795Ca. The bottom surface portion 179Cb is provided with a through hole 1795Cb. These through holes 1795Ca, 1795Cb may be used to arrange a fixing member for fixing the substrate holder 170C to the key 10, and may have a function similar to that of the through holes 1795*a*, 1795*b* in the first embodiment, for example. A raised portion 177C is arranged in the substantially central portion of the bottom surface portion 179C via an elastic portion 1775C. The elastic portion 1775C functions as an elastic body by being cantilevered by the bottom surface portion 179C. The raised portion 177C is raised in the downward direction D3*b* with respect to the bottom surface portion 179C. The bottom surface portion 179C is provided with thinned grooves 179Cc, 179Cd at the end portion of the downward direction D3*b*.

At the end portion in the front direction D2*a* of the bottom surface portion 179C, a side surface part 174Ca, an elastic portion 1755C, and a side surface part 174Cb which extend in the downward direction D3*b* are arranged in this order along the left-right direction D1. The side surface parts 174Ca, 174Cb, and the elastic portion 1755C are plate-shaped members including a portion which is substantially perpendicular to the bottom surface portion 179C. A raised portion 175C is arranged at the end portion in the downward direction D3*b* of the elastic portion 1755C. The elastic portion 1755C functions as an elastic body by being cantilevered by the bottom surface portion 179C. The raised portion 175C is raised in the back direction D2*b* with respect to the elastic portion 1755C. The raised portion 175 includes a portion that is substantially parallel to the bottom surface portion 179 on the surface on the side in the upper direction D1*a*.

A side surface part 178C extending in the downward direction D3*b* is arranged at the end portion in the back direction D2*b* of the bottom surface portion 179C. A guide part 178Ca protruding toward the front direction D2*a* is arranged in the side surface part 178C. The guide part 178Ca is a plate-shaped member extending in the vertical D3 and front-back direction D2. A cover part 173C extending toward the forward D2*a* is arranged at the end portion in the downward direction D3*b* of the side surface part 178C. The cover part 173C is a plate-shaped member substantially parallel to the bottom surface portion 179C.

As shown in FIG. 20, a notch part 7508C is formed in a passive circuit substrate 750C with the coils on the surface 750Ca thereof. The notch part 7508C and the guide part 178Ca have corresponding shapes. When the passive circuit substrate 750C is mounted to the substrate holder 170C, at first, the passive circuit substrate 750C is arranged in the substrate holder 170C so that the guide part 178Ca is inserted into the notch part 7508C as shown in FIG. 19. Thereafter, when a force F is applied to the raised portion 175C in the front direction D2*a*, the elastic portion 1755C is elastically deformed and the raised portion 175C moves in the front direction D2*a*. Then, the passive circuit substrate 750C is fitted into the substrate holder 170C by pushing the passive circuit substrate 750C toward the bottom surface portion 179C by a force Fc.

The position in the left-right direction D1 of the passive circuit substrate 750C is determined by the fitting of the guide part 178Ca of the substrate holder 170C and the notch part 7508C (in particular, the contact between the guide part 178Ca and the notch part 7508C in the left-right direction D1), and the position in the front-back direction D2 is determined by the guide part 178Ca (or the side surface part 178C) and the side surface parts 174Ca, 174Cb. The raised portion 177C moved toward the upward direction D3*a* by the passive circuit substrate 750C attempts to return to its original position by the restoring force of the elastic portion 1775C, respectively. Therefore, the raised portion 177C applies a force in the downward direction D3*b* to the passive circuit substrate 750C, and the passive circuit 750C is pressed against the cover part 173C and the raised portion 177C. As a result, the vertical position D3 of the passive circuit substrate 750C is determined. In this way, the passive circuit substrate 750C is held by the substrate holder 170C.

On the other hand, in the state where the passive circuit substrate 750C is held by the substrate holder 170C, the elastic portion 1755C is elastically deformed by applying a force F and the raised portion 175C is moved in the front direction D2*a*, thereby the retention of the passive circuit substrate 750C by the substrate holder 170C is released. As described above, in the state where the elastic portion 1755C is further elastically deformed than in the state where the passive circuit substrate 750C is held by the substrate holder 170C, the retention of the passive circuit substrate 750C is released.

Fifth Embodiment

In the fifth embodiment, a passive circuit substrate 750D in which two notch parts 7505D and 7508D are formed and a substrate holder 170D for holding it will be described with reference to FIG. 22 and FIG. 23. The passive circuit substrate 750D includes the coils on the surface 750Da thereof.

Figure 22:
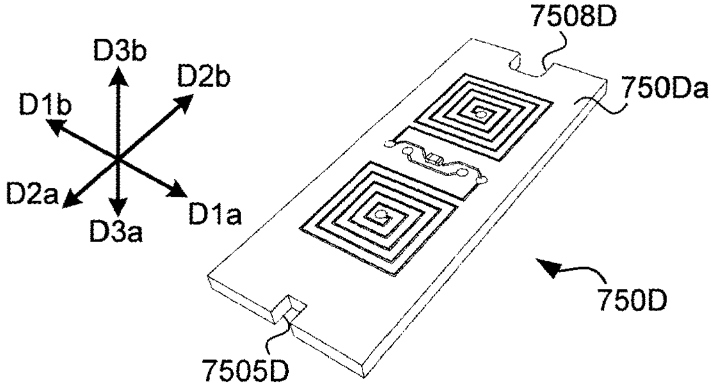
FIG. 22 is a diagram explaining a passive circuit substrate in a fifth embodiment of the present disclosure.

FIG. 22 is a diagram explaining a passive circuit substrate in the fifth embodiment of the present disclosure. The notch part 7508D in the passive circuit substrate 750D is the same as the notch part 7508C in the fourth embodiment. The notch part 7505D is formed at a position facing the notch part 7508D.

Figure 23:
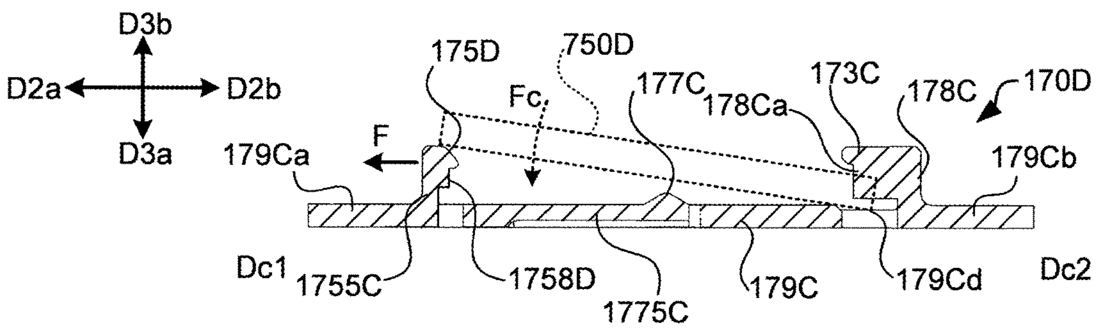
FIG. 23 is a diagram explaining a cross-section of a substrate holder (corresponding to FIG. 19) in the fifth embodiment of the present disclosure.

FIG. 23 is a diagram explaining a cross-section of a substrate holder (corresponding to FIG. 19) in the fifth embodiment of the present disclosure. Although the substrate holder 170D has almost the same configuration as the substrate holder 170C, there are no side surface parts 174Ca, 174Cb in the substrate holder 170C. Also, a guide part 1758D protruding from the elastic portion 1755C is arranged on the bottom surface portion 179C side of the raised portion 175C. The same configuration as the substrate holder 170C in the fourth embodiment is denoted by the same symbols. The guide part 1758D has a shape corresponding to the notch part 7505D, and in the state where the passive circuit substrate 750D is held by the substrate holder 170D, the guide part 1758D is fitted into the notch part 7505D.

In this example, in the state where the passive circuit substrate 750D is held by the substrate holder 170D, the position of the passive circuit substrate 750D in the left-right direction D1 is determined by the fitting of the guide part 178Ca and the notch part 7508D (in particular, the contact between the guide part 178Ca and the notch part 7508D in the left-right direction D1) and the fitting of the guide part 1758D and the notch part 7505D (in particular, the contact between the guide part 1758D and the notch part 7505D in the left-right direction D1), and the position in the front-back direction D2 is determined by the guide part 178Ca (or the side surface part 178C) and the guide part 1758D (or the elastic portion 1755C). The position of the passive circuit substrate 750D in the vertical direction D3 is determined in the same manner as in the fourth embodiment. In this way, the passive circuit substrate 750D is held by the substrate holder 170D.

On the other hand, in the state where the passive circuit substrate 750D is held by the substrate holder 170D, the elastic portion 1755D is elastically deformed by applying a force F and the raised portion 175D is moved in the front direction D2*a*, thereby the retention of the passive circuit substrate 750D by the substrate holder 170D is released. As described above, in the state where the elastic portion 1755C is further elastically deformed than in the state where the passive circuit substrate 750D is held by the substrate holder 170D, the retention of the passive circuit substrate 750D is released.

Sixth Embodiment

In the sixth embodiment, a keyboard apparatus 1E including a substrate holder 170E fixed to a member interlocking with the key 10 instead of the key 10 will be described with reference to FIG. 24 to FIG. 26. Here, the key connecting portion 301 of the loaded portion 30 is exemplified as a member interlocking with the key 10.

Figure 24:
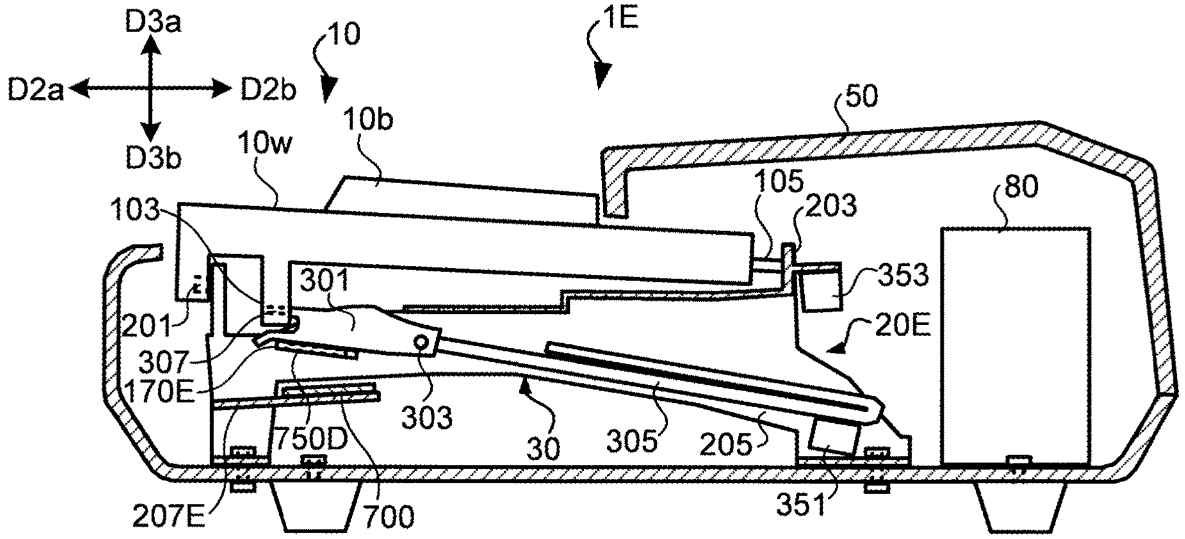
FIG. 24 is a diagram explaining an internal structure of a keyboard apparatus (when a key is released) in a sixth embodiment of the present disclosure.
Figure 25:
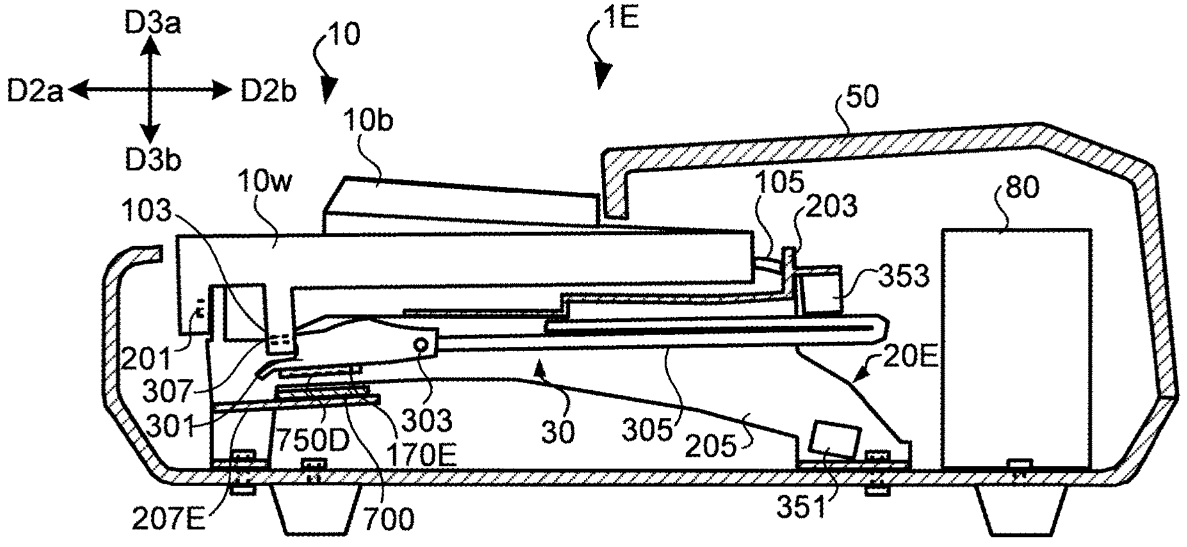
FIG. 25 is a diagram explaining an internal structure of a keyboard apparatus (when a white key is depressed) in the sixth embodiment of the present disclosure.

FIG. 24 is a diagram explaining an internal structure of a keyboard apparatus (when a key is released) in the sixth embodiment of the present disclosure. FIG. 25 is a diagram explaining an internal structure of a keyboard apparatus (when a white key is depressed) in the sixth embodiment of the present disclosure. In the keyboard apparatus 1E, the substrate holder 170E is fixed to the lower surface side of the key connecting portion 301. Therefore, a substrate holding portion 207E in which the active circuit substrate 700 is arranged is arranged below the key connecting portion 301. When the key 10 is depressed in the state in FIG. 24, as shown in FIG. 25, the loaded portion 30 rotates while being interlocked with the rotation of the key 10, the weight portion 305 moves upward and collides with the upper stopper 353, and further movement is restricted. In this case, as shown in FIG. 25, the key connecting portion 301 moves downward, and the active circuit substrate 700 approaches the passive circuit substrate 750D. Here, although the substrate holder 170E is arranged at a position close to the center of rotation as a position where the amount of movement is reduced in this case of rotation, the substrate holder 170E may be arranged at a position away from the center of rotation depending on the application.

Also, with respect to the angle between the passive circuit substrate 750D and the active circuit substrate 700, the difference between when the key is released and when the key is depressed is larger than the difference in the first embodiment in which the passive circuit substrate 750D is mounted to the key 10. Even if the change in this angle is large, since the amount of magnetic flux passing through the passive coil 751 is changed, there is no problem even in the positional relationship between the passive coil 751 and the active coil 701 as shown in the sixth embodiment.

Figure 26:
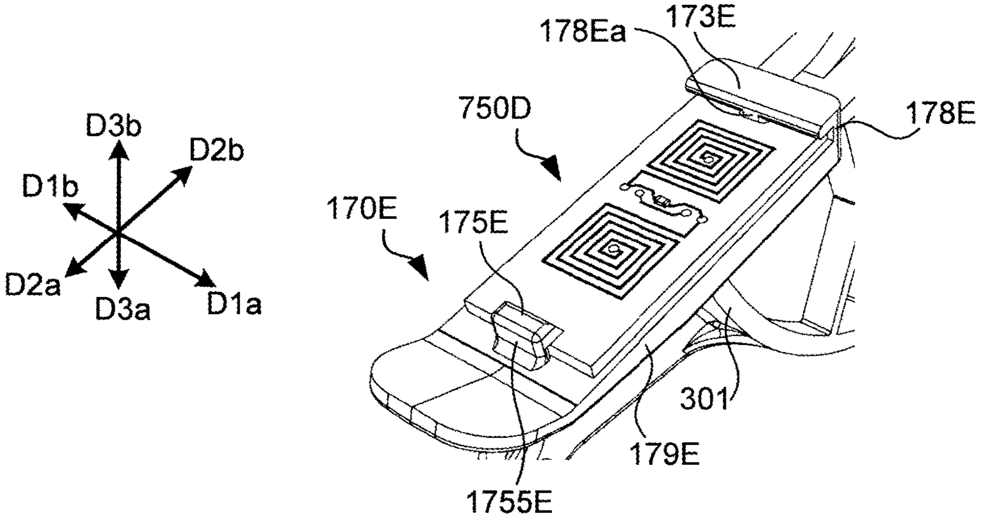
FIG. 26 is a diagram explaining a substrate holder to which a passive circuit substrate is mounted in the sixth embodiment of the present disclosure.

FIG. 26 is a diagram explaining a substrate holder to which the passive circuit substrate is mounted in the sixth embodiment of the present disclosure. In this example of the substrate holder 170E, the configuration corresponding to the substrate holder 170D in the fifth embodiment is applied as it is. Here, the substrate holder 170E and the key connecting portion 301 are integrally formed by injection molding and are formed of the same material. Since the substrate holder 170E and the substrate holder 170D have the same configuration, the passive circuit substrate 750D shown in the fifth embodiment is mounted to the substrate holder 170E. A bottom surface part 179E, a side surface part 178E, a cover part 173E, a guide part 178Ea, an elastic portion 1755E, and a raised portion 175E in the substrate holder 170E correspond to the bottom surface part 179C, the side surface part 178C, the cover part 173C, the guide part 178Ca, the elastic portion 1755C, and the raised portion 175D in the substrate holder 170D, respectively.

Seventh Embodiment

In the seventh embodiment, a keyboard apparatus 1F including a substrate holder 170F mounted to parts other than the key 10 and the loaded portion 30 will be described with reference to FIG. 27 to FIG. 31.

Figure 27:
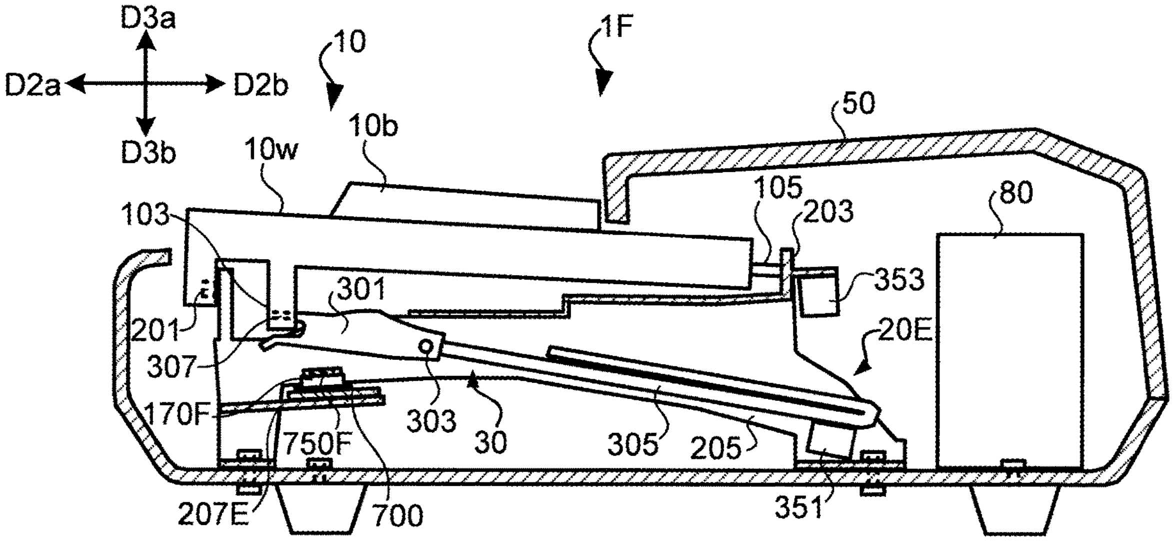
FIG. 27 is a diagram explaining an internal structure of a keyboard apparatus (when a key is released) in a seventh embodiment of the present disclosure.
Figure 28:
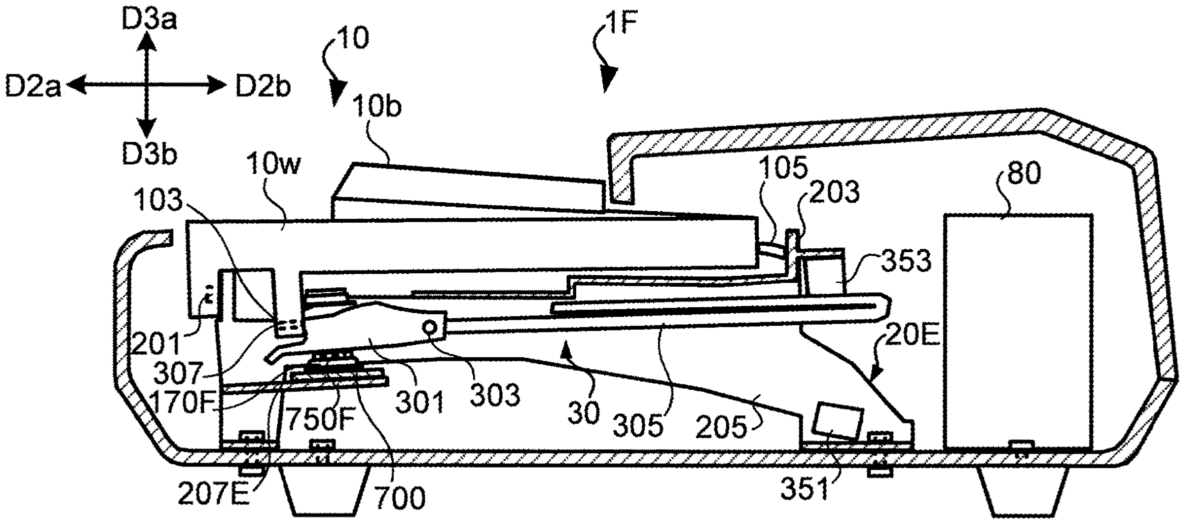
FIG. 28 is a diagram explaining an internal structure of a keyboard apparatus (when a white key is depressed) in the seventh embodiment of the present disclosure.

FIG. 27 is a diagram explaining an internal structure of the keyboard apparatus (when a key is released) in the seventh embodiment of the present disclosure. FIG. 28 is a diagram explaining an internal structure of the keyboard apparatus (when the white key is depressed) in the seventh embodiment of the present disclosure. In the keyboard apparatus 1F, the substrate holder 170F is arranged on the substrate holding portion 207E so as to cover the active circuit substrate 700 below the key connecting portion 301. The substrate holder 170F has a dome-shaped structure formed of an elastic material such as rubber, and has a mechanism for holding a passive circuit substrate 750F in a part of the dome-shaped structure. In the state shown in FIG. 27, when the key 10 is depressed, as shown in FIG. 28, the loaded portion 30 rotates while being interlocked with the rotation of the key 10, the weight portion 305 moves upward and collides with the upper stopper 353, and further movement is restricted. In this case, the key connecting portion 301 contacts the substrate holder 170F while the key connecting portion 301 moves downward.

The key connecting portion 301 moves further downward to deform the substrate holder 170F. By deforming the substrate holder 170F, the passive circuit substrate 750F held by the substrate holder 170F approaches the active circuit substrate 700. When the key 10 returns to its original position and to be the state shown in FIG. 27, the substrate holder 170F returns to its original form by its own restoring force, and the passive circuit substrate 750F moves away from the active circuit substrate 700. In this manner, in a part of the key pressing range, the shape of the substrate holder 170F changes with the movement of the key 10. Therefore, the substrate holder 170F can also be referred to as a member interlocking with the key 10. Next, the substrate holder 170F will be described.

Figure 29:
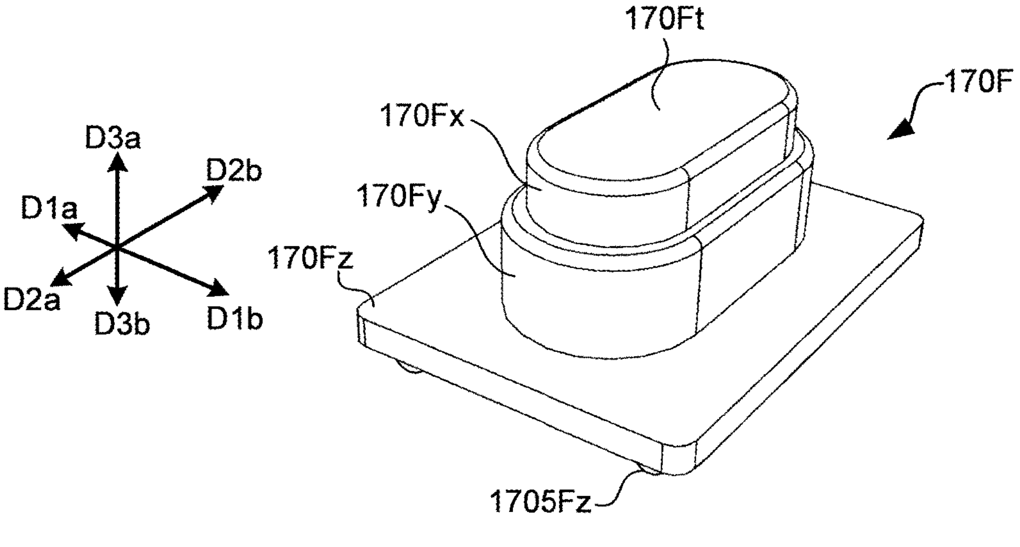
FIG. 29 is a diagram explaining a substrate holder to which a passive circuit substrate is mounted in the seventh embodiment of the present disclosure.
Figure 30:
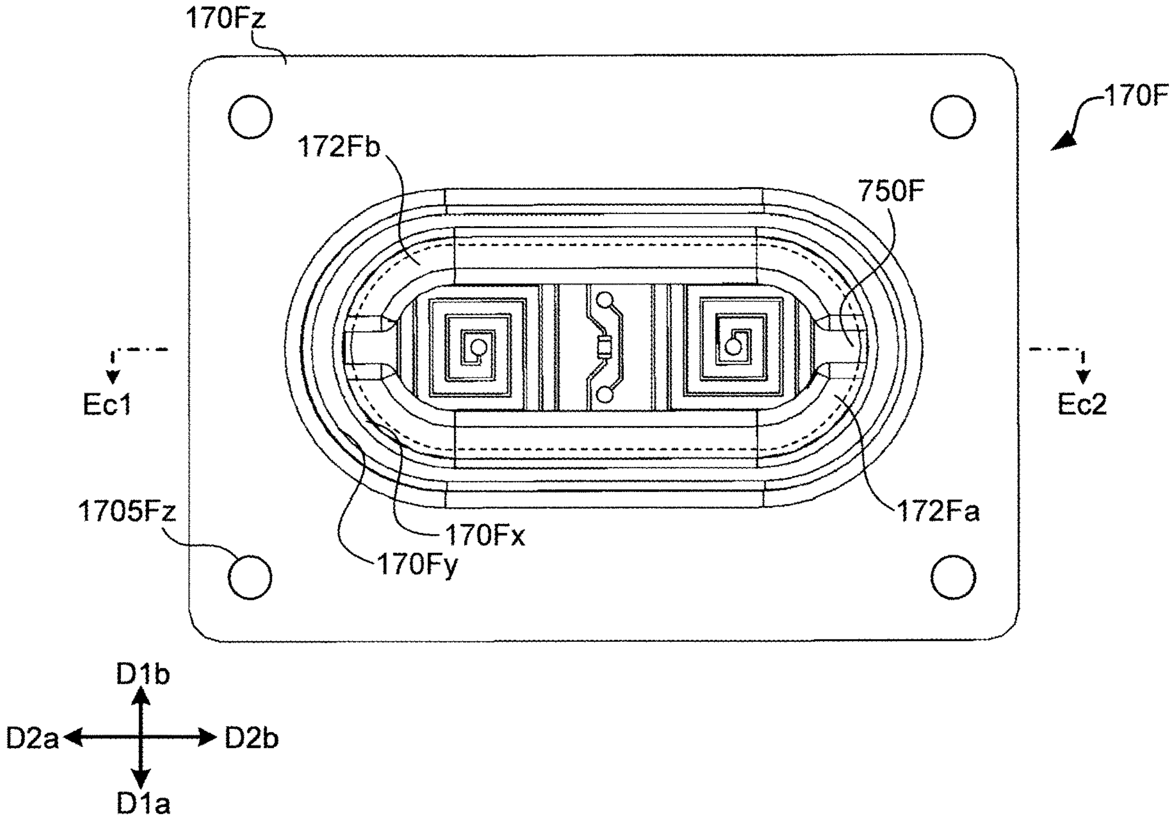
FIG. 30 is a diagram explaining the inside of a substrate holder to which a passive circuit substrate is mounted (a view of a substrate holder from below) in the seventh embodiment of the present disclosure.
Figure 31:
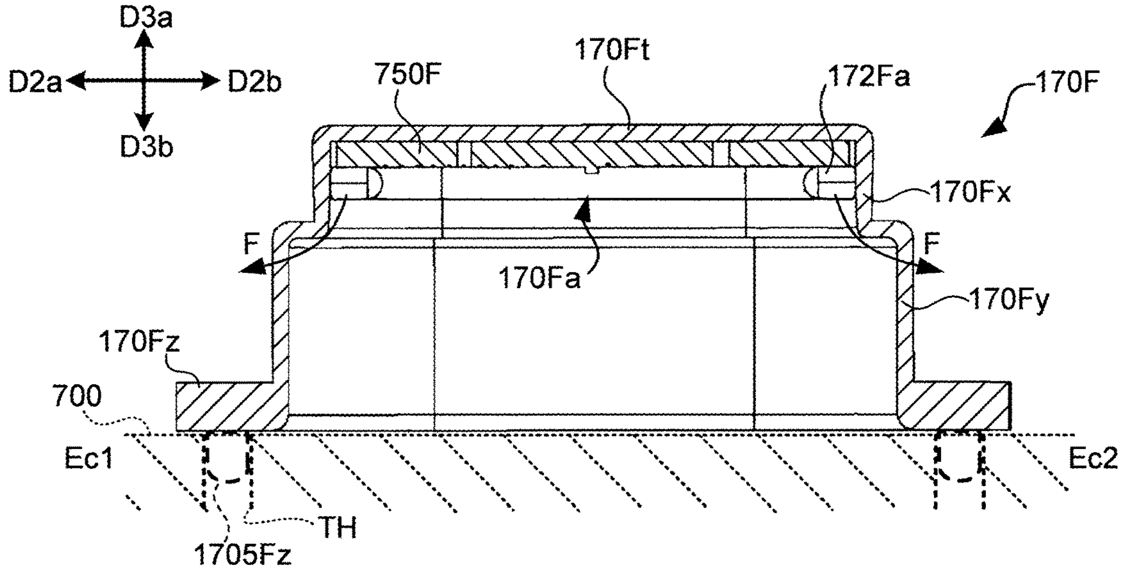
FIG. 31 is a diagram explaining a cross-section (cut line Ec1-Ec2) of a substrate holder in the seventh embodiment of the present disclosure.

FIG. 29 is a diagram explaining a substrate holder to which the passive circuit substrate is mounted in the seventh embodiment of the present disclosure. FIG. 30 is a diagram explaining an inside of a substrate holder to which the passive circuit substrate is mounted (a view of a substrate holder from below) in the seventh embodiment of the present disclosure. FIG. 31 is a diagram explaining a cross-section (cut line Ec1-Ec2) of the substrate holder in the seventh embodiment of the present disclosure. The substrate holder 170F includes a base portion 170Fz and a portion that forms a dome-shape extending in the upward direction D3*a* from the base portion 170Fz. The portion forming the dome-shape includes a lower side surface part 170Fy, an upper side surface part 170Fx, and a top surface part 170Ft. The upper side surface part 170Fx is provided with cover parts 172Fa, 172Fb protruding to the inner surface side.

In the base portion 170Fz, a protrusion part 1705Fz protruding in the downward direction D3*b* is arranged corresponding to each of the four corners. This protrusion part 1705Fz is fitted into a hole part TH provided in the active circuit substrate 700. As a result, the position of the substrate holder 170F (the passive circuit substrate 750F) with respect to the active circuit substrate 700 is determined.

The passive circuit substrate 750F has an outer circumference matching the shape of the upper side surface part 170Fx. Unlike the passive circuit substrate 750 in the embodiment described above, in the passive circuit substrate 750F, the part corresponding to the corner is formed in an arc shape. The passive circuit substrate 750F is held by the substrate holder 170F by being sandwiched between the top surface part 170Ft and the cover parts 172Fa, 172Fb. Since the passive circuit substrate 750F is a rigid structure, even if the substrate holder 170F is an elastic body which is arranged on the top surface part 170Ft side than on the cover parts 172Fa, 172Fb, its shape is retained because the passive circuit substrate 750F and the shape is hardly deformed. Therefore, when the key connecting portion 301 deforms the substrate holder 170F, mainly the lower side surface part 170Fy is deformed, and the top surface part 170Ft approaches toward the active circuit substrate 700.

When the passive circuit substrate 750F is mounted to or removed from the substrate holder 170F, the substrate holder 170F is deformed by applying a force F to spread the cover parts 172Fa, 172Fb outwardly, and it is possible to expand an opening 170Fa to the extent that the passive circuit substrate 750F can pass through. That is, the passive circuit substrate 750F passes through the gap between the cover part 172Fa and the cover part 172Fb, so that it can be mounted to or removed from the substrate holder 170F.

The substrate holder 170F is provided corresponding to each key 10. The base portions 170Fz of the adjacent substrate holder 170F may be connected.

Eighth Embodiment

In the eighth embodiment, in this case of forming the substrate holder 170F as explained in the seventh embodiment by injection molding, a substrate holder 170G formed by placing the passive circuit substrate 750F in an injection molding mold will be described with reference to FIG. 32 and FIG. 33.

Figure 32:
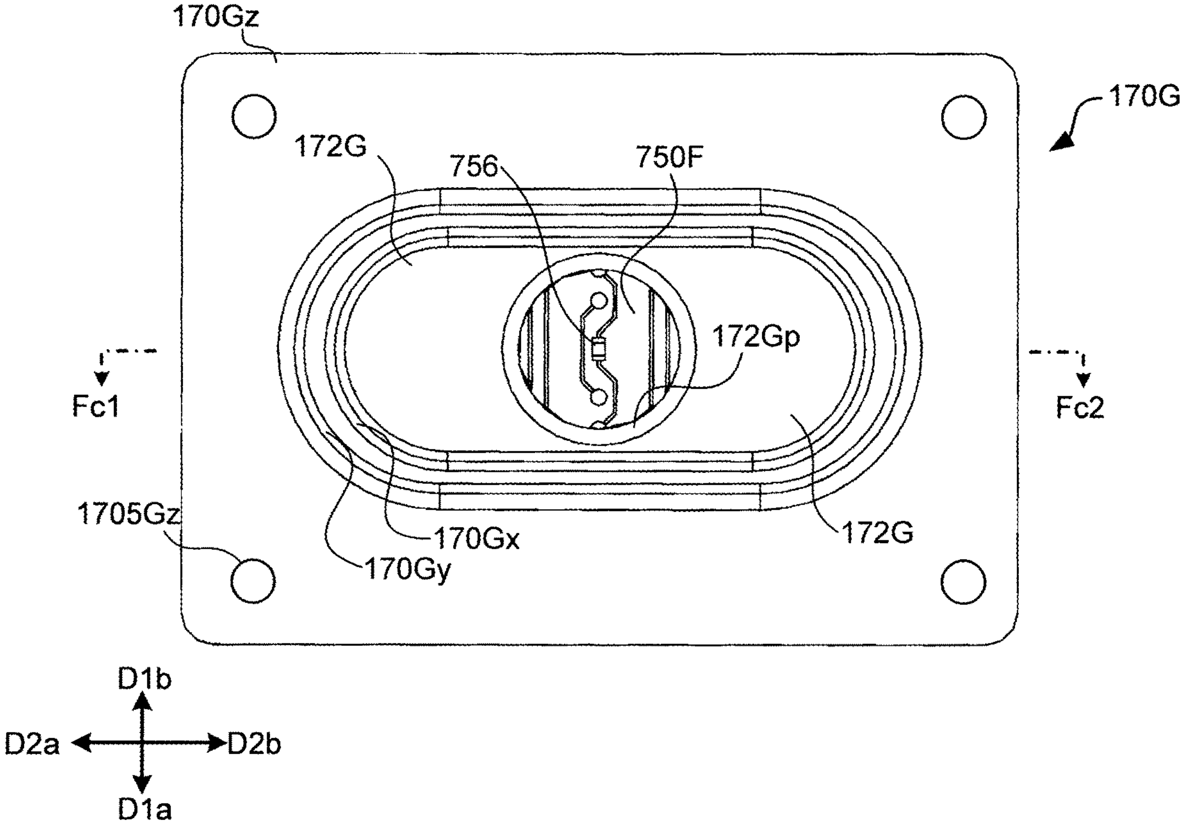
FIG. 32 is a diagram explaining the inside of a substrate holder to which a passive circuit substrate is mounted (a view of a substrate holder from below) in an eighth embodiment of the present disclosure.
Figure 33:
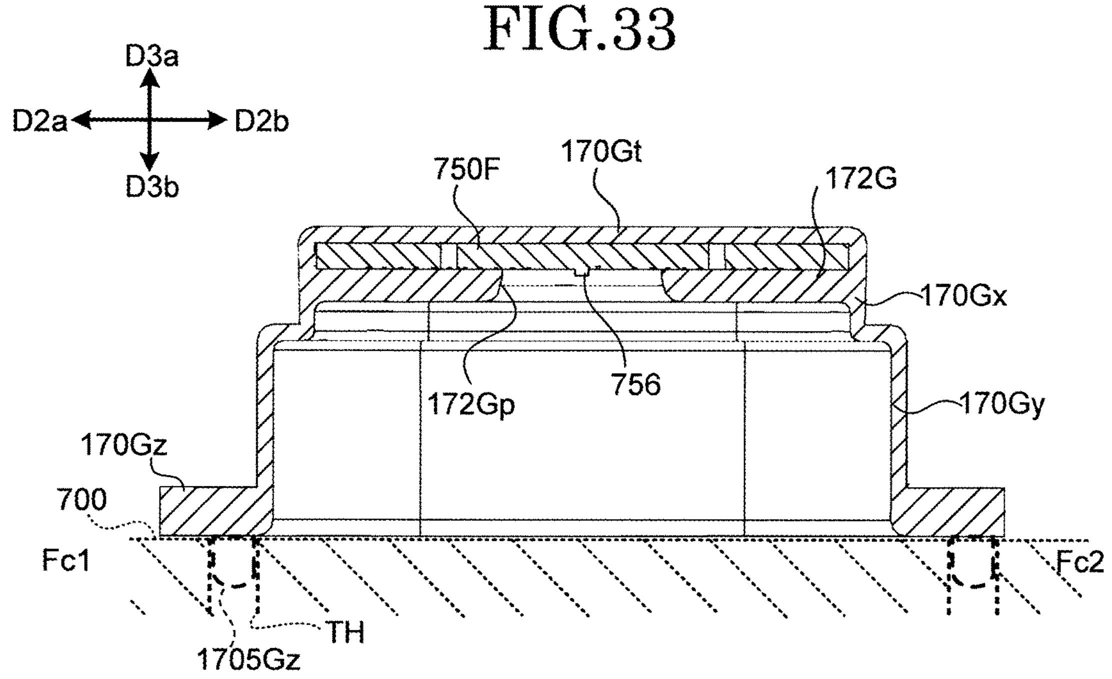
FIG. 33 is a diagram explaining a cross-section (cut line Fc1-Fc2) of a substrate holder in the eighth embodiment of the present disclosure.

FIG. 32 is a diagram explaining an inside of a substrate holder to which a passive circuit substrate is mounted in the eighth embodiment of the present disclosure. FIG. 33 is a diagram explaining a cross-section (cut line Fc1-Fc2) of a substrate holder in the eighth embodiment of the present disclosure. Similar to the substrate holder 170F, the substrate holder 170G is an elastic body formed by injection molding. In this example, since the passive circuit substrate 750F is incorporated into the elastic body during injection molding, the substrate holder 170G is not removable from the passive circuit substrate 750F. An upper surface portion 170Gt, an upper side surface part 170Gx, a lower side surface part 170Gy, a base portion 170Gz, and a protrusion part 1705Gz in the substrate holder 170G correspond to the top surface part 170Ft, the upper side surface part 170Fx, the lower side surface part 170Fy, the base portion 170Fz, and the protrusion part 1705Fz in the substrate holder 170F, respectively.

On the other hand, in the substrate holder 170G, a configuration of a cover part 172G arranged on the inner surface side of the upper side surface part 170Gx is different from the cover part 172Fa of the substrate holder 170F. A through hole 172Gp is formed on the cover part 172G. Although the through hole 172Gp does not necessarily have to be formed, in this example, the capacitor 756 of the passive circuit substrate 750F is exposed. Depending on the conditions of injection molding, the resin may stress the capacitor 756 due to expansion and contraction of the material. As in this example, by forming the through hole 172Gp that exposes the capacitor 756 in the cover part

172G, the effects of such stresses can be avoided. On the other hand, it is desirable that this through hole 172Gp be as small as possible for holding the passive circuit substrate 750F. Also, to prevent the position of the passive circuit substrate 750F from changing during injection molding, it is desirable to support the passive circuit substrate 750F from the outside by a plurality of pins or the like. In this case, for example, at the top surface part 170Ft and the upper side surface part 170Fx, a through hole having a shape corresponding to the part where the pins are arranged remains. However, it is desirable that all through holes including the above described through hole 172Gp have a size which does not allow the passive circuit substrate 750F to pass through.

As described above, the substrate holder 170G cannot removably configure the passive circuit substrate 750F because the substrate holder 170G and the passive circuit substrate 750F are integrally formed. However, it is effective when it is efficient to replace the entire substrate holder 170G.

Ninth Embodiment

In the ninth embodiment, a substrate holder 170H at the time when the substrate holder 170G in the eighth embodiment is applied instead of the substrate holder 170E in the sixth embodiment will be described with reference to FIG. 34.

Figure 34:
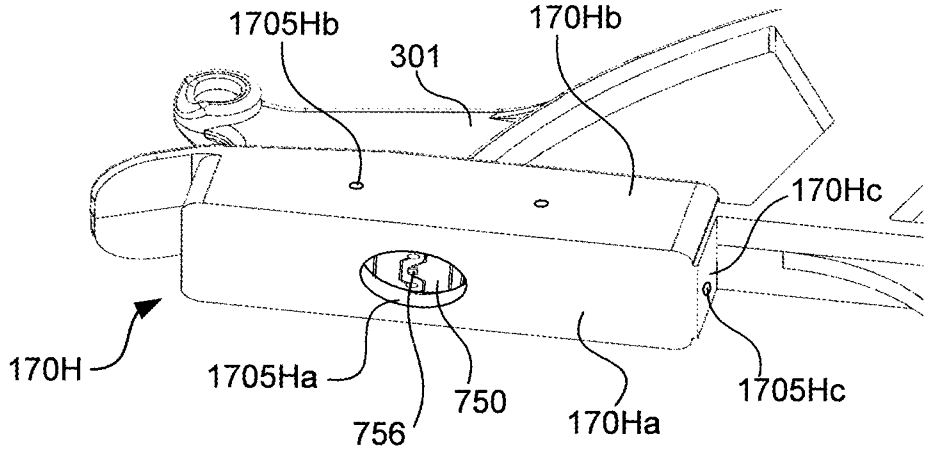
FIG. 34 is a diagram explaining a substrate holder to which a passive circuit substrate is mounted in a ninth embodiment of the present disclosure.

FIG. 34 is a diagram explaining a substrate holder to which a passive circuit substrate is mounted in the ninth embodiment. In this example, the substrate holder 170H is arranged on the lower surface side of the key connecting portion 301. The substrate holder 170H and the key connecting portion 301 are integrally formed by injection molding. In this case, the passive circuit substrate 750 is also embedded in a mold and formed together with the substrate holder 170H. Similar to the substrate holder 170G of the eighth embodiment, a through hole 1705Ha is formed in a bottom surface part 170Ha of the substrate holder 170H. The capacitor 756 of the passive circuit substrate 750 is exposed from the substrate holder 170H by the through hole 1705Ha. Through holes 1705Hb and 1705Hc are formed in side surface parts 170Hb and 170Hc. The through holes 1705Hb and 1705Hc are holes formed because the pins supporting the passive circuit substrate 750 were arranged during injection molding.

Tenth Embodiment

The magnetic induction type sensor can be used in an acoustic piano. In the tenth embodiment, a grand piano 1J using the substrate holder 170 will be described with reference to FIG. 35 to FIG. 37.

Figure 35:
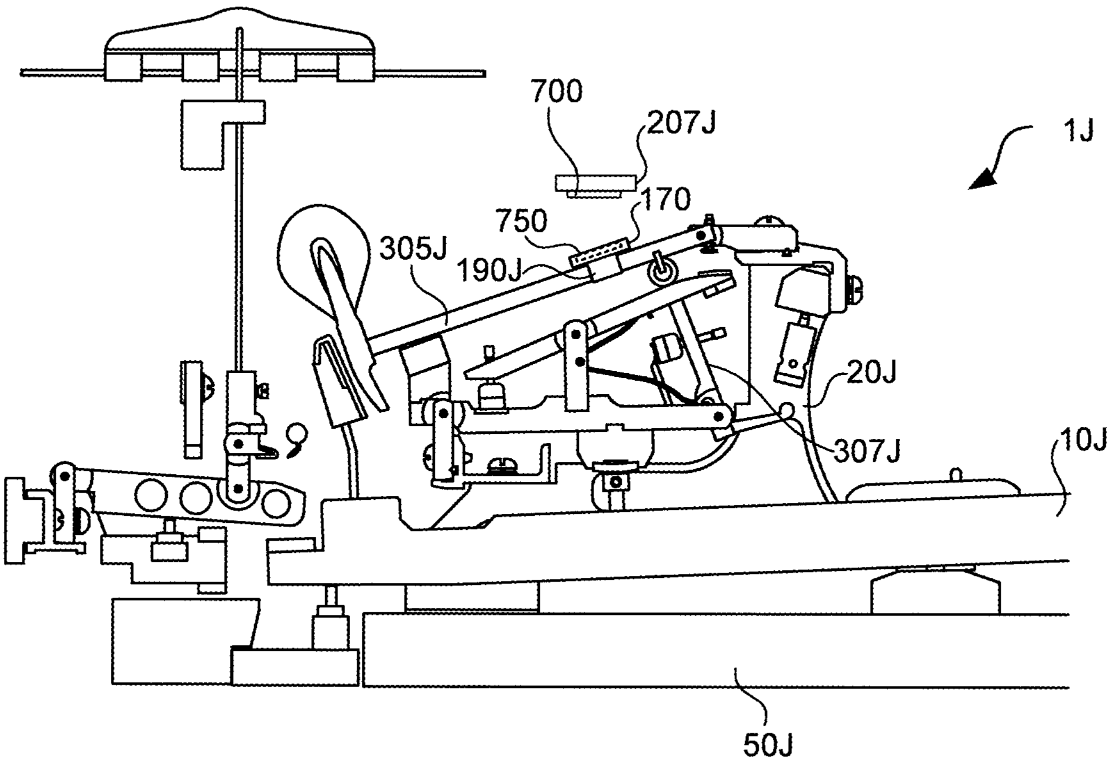
FIG. 35 is a diagram explaining an internal structure of a keyboard apparatus (when a key is released) in a tenth embodiment of the present disclosure.
Figure 36:
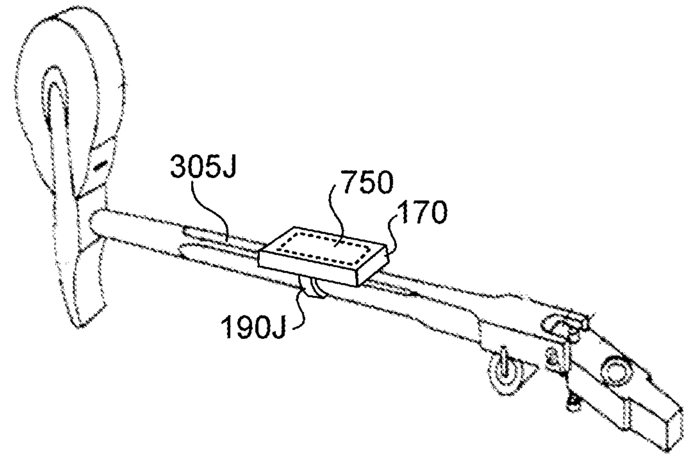
FIG. 36 is a diagram explaining a mounting position of a substrate holder in the tenth embodiment of the present disclosure.

FIG. 35 is a diagram explaining an internal structure of a keyboard apparatus (when a key is released) in the tenth embodiment of the present disclosure. FIG. 36 is a diagram explaining a mounting position of a substrate holder in the tenth embodiment of the present disclosure. In this example, the substrate holder 170 is mounted by a fixing member 190J to a hammer shank 305J of the grand piano 1J. The fixing member 190J has a shape that surrounds the axis of the hammer shank 305J. When the outer edge is not a circle in a cross-section (cross-section perpendicular to the longitudinal direction) as in the case of the hammer shank 305J shown in FIG. 36, it is possible to avoid rotation around the shaft by using the fixing member 190J having an inner surface shape corresponding to the outer edge shape.

The fixing member 190J may be bonded to the hammer shank 305J. Also, the fixing member 190 described in the first embodiment may be inserted into the hammer shank 305J to fix the substrate holder 170 to the hammer shank 305J.

The active circuit substrate 700 is arranged in a substrate holding portion 207J fixed to a frame 20J. Also, in this example, although the active circuit substrate 700 is arranged on the lower surface side of the substrate holding portion 207J, it may be arranged on the upper surface side of the substrate holding portion 207J as long as the substrate holding portion 207J is a resin-made structure. The substrate holder 170 may be mounted to another position of the hammer shank 305J.

Figure 37:
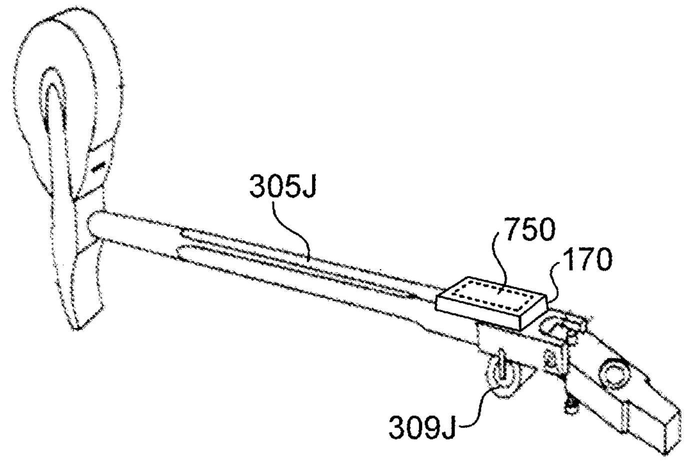
FIG. 37 is a diagram explaining another exemplary mounting position of a substrate holder in the tenth embodiment of the present disclosure.

FIG. 37 is a diagram explaining another exemplary mounting position of a substrate holder in the tenth embodiment of the present disclosure. In the example shown in FIG. 37, the substrate holder 170 is mounted to the opposite surface of the hammer shank 305J to which a hammer roller 309J is mounted. This surface is a part with a relatively wide range of planes in the hammer shank 305J. Therefore, it is easy to arrange the substrate holder 170.

Also, the substrate holder 170 may be mounted to a jack 307J or a key 10J instead of the hammer shank 305J. In the case where the substrate holder 170 is mounted to the jack 307J, the active circuit substrate 700 may be arranged on the frame 20J. In this case, the active circuit substrate 700 may be arranged upright so that the normal line on that plane faces the jack 307J. In addition, if the substrate holder 170 is mounted to the key 10J, and the active circuit substrate 700 may be arranged on a key bed 50J.

Eleventh Embodiment

In the eleventh embodiment, an upright piano 1K using the substrate holder 170 will be described with reference to FIG. 38 to FIG. 40.

Figure 38:
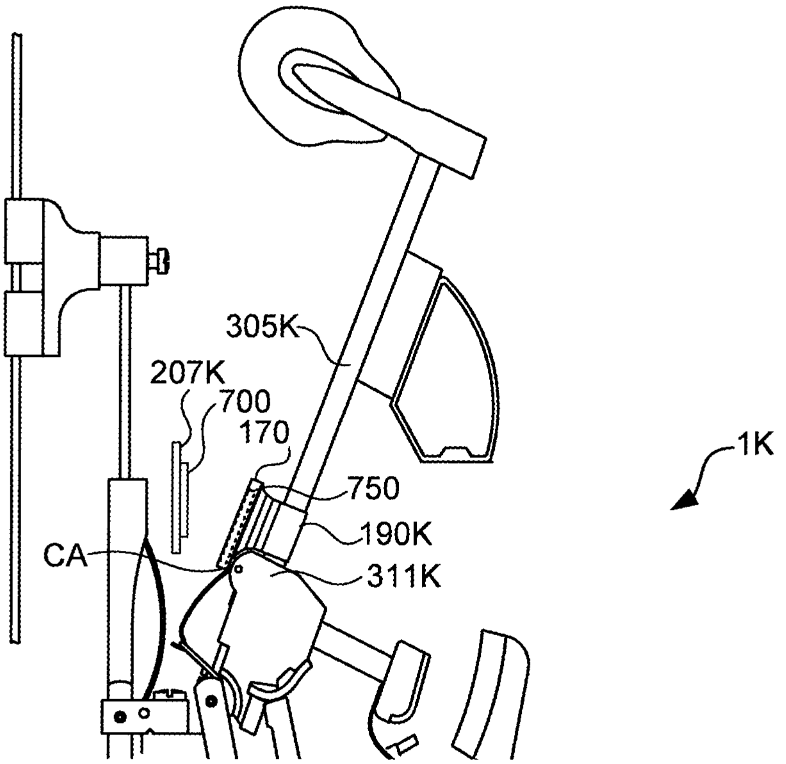
FIG. 38 is a diagram explaining an internal structure of a keyboard apparatus (when a key is released) in an eleventh embodiment of the present disclosure.
Figure 39:
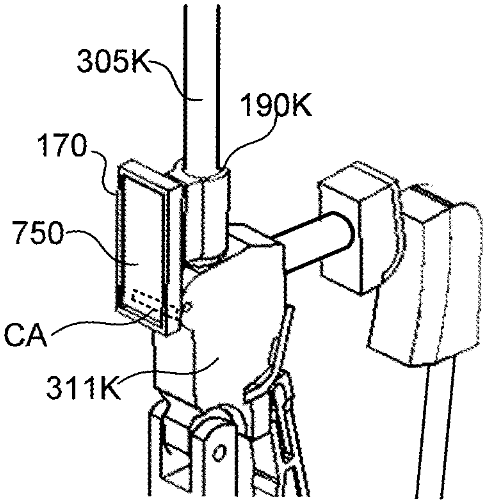
FIG. 39 is a diagram explaining a mounting position of a substrate holder in the eleventh embodiment of the present disclosure.

FIG. 38 is a diagram explaining an internal structure of a keyboard apparatus (when a key is released) in the eleventh embodiment of the present disclosure. FIG. 39 is a diagram explaining a mounting position of a substrate holder in the eleventh embodiment of the present disclosure. In this example, the substrate holder 170 is mounted to a hammer shank 305K of the upright piano 1K by a fixing member 190K. The fixing member 190K has a shape that surrounds the axis of the hammer shank 305K. The hammer shank 305K has a cylindrical shape. Therefore, a part of a butt 311K supporting the hammer shank 305K and the substrate holder 170 are in contact with each other in a region CA so that the substrate holder 170 does not rotate around the hammer shank 305K. The fixing member 190J may be bonded to the hammer shank 305J. The fixing member 190 described in the first embodiment may be inserted into and fixed to the butt 311K in the region CA.

The active circuit substrate 700 is arranged in a substrate holding portion 207K fixed to a frame (not shown). The substrate holder 170 may be mounted to the hammer shank 305K in another form.

Figure 40:
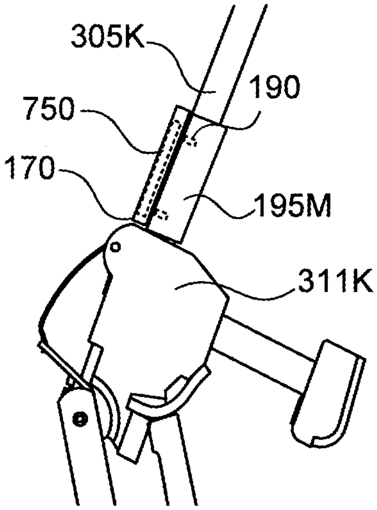
FIG. 40 is a diagram explaining an example in which a substrate holder is mounted in another form in the eleventh embodiment of the present disclosure.

FIG. 40 is a diagram explaining an example in which a substrate holder is mounted in another form in the eleventh embodiment of the present disclosure. In this example, the fixing member 190 described in the first embodiment is inserted into the hammer shank 305K to fix the substrate holder 170 to the hammer shank 305K. In this case, an auxiliary member 195M for filling the space between the substrate holder 170 and the hammer shank 305K may be arranged.

Twelfth Embodiment

In the twelfth embodiment, a substrate holder 170N that holds a passive circuit substrate 750N by another configuration compared to the substrate holder 170E formed integrally with the key connecting portion 301 as in the sixth embodiment will be described with reference to FIG. 41 and FIG. 42.

Figure 41:
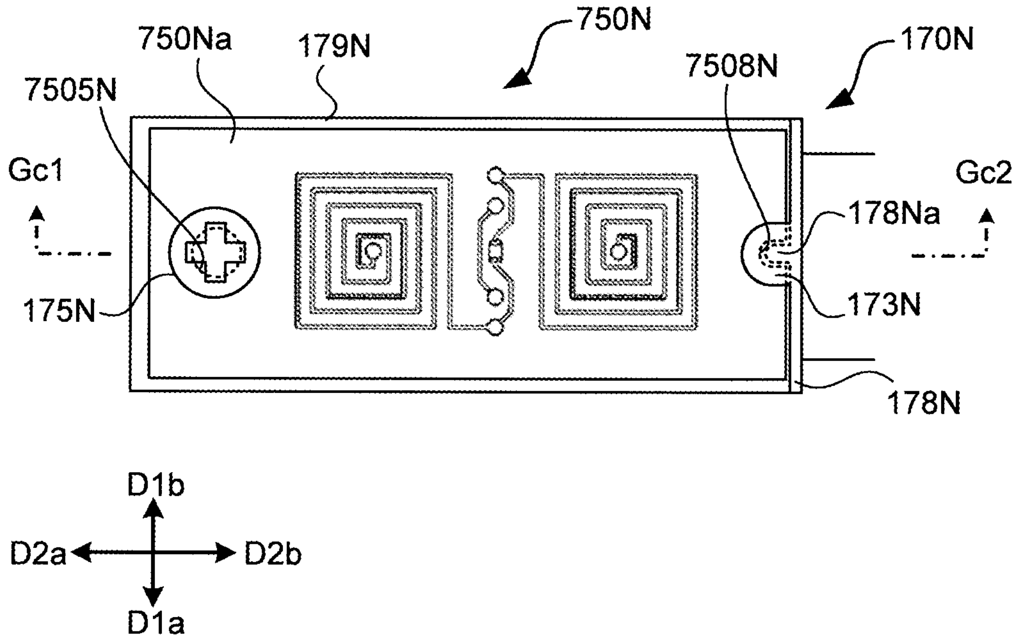
FIG. 41 is a diagram explaining a substrate holder to which a passive circuit substrate is mounted in a twelfth embodiment of the present disclosure.
Figure 42:
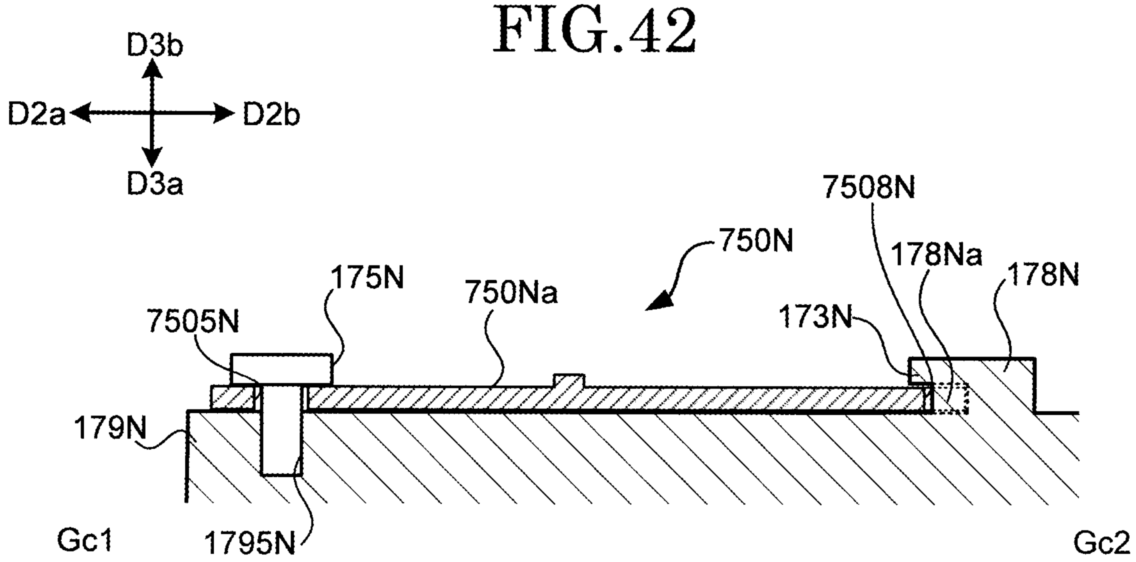
FIG. 42 is a diagram explaining a cross-section (cut line Gc1-Gc2) of a substrate holder in the twelfth embodiment of the present disclosure.

FIG. 41 is a diagram explaining a substrate holder to which a passive circuit substrate is mounted in the twelfth embodiment of the present disclosure. FIG. 42 is a diagram explaining a cross-section (cut line Gc1-Gc2) of a substrate holder in the twelfth embodiment of the present disclosure. FIG. 41 is a diagram when the substrate holder 170N is viewed from below. The substrate holder 170N is arranged below the key connecting portion 301.

A bottom surface portion 179N, a side surface part 178N, a cover part 173N, and a guide part 178Na in the substrate holder 170N correspond to the bottom surface portion 179E, the side surface part 178E, the cover part 173E, and the guide part 178Ea in the substrate holder 170E shown in FIG. 26, respectively. A notch part 7508N in the passive circuit substrate 750N mounted to the substrate holder 170N corresponds to the notch part 7508D in the passive circuit substrate 750D shown in FIG. 22.

On the other hand, the substrate holder 170N has an external thread 175N and an internal thread 1795N instead of the substrate holder 170E having the elastic portion 1755E and the raised portion 175E. The internal thread 1795N is formed in the bottom surface portion 179N. The passive circuit substrate 750N has an opening 7505N instead of the passive circuit substrate 750D having the notch part 7505D. In the case where the external thread 175N is fastened to the internal thread 1795N, the external thread 175N passes through the opening 7505N, and the head part of the external thread 175N contacts a surface 750Na of the passive circuit substrate 750N.

In this state, the passive circuit substrate 750N is sandwiched between the head part of the external thread 175N and the bottom surface portion 179N to determine the position of the passive circuit substrate 750N in the vertical direction D3, the position of the passive circuit substrate 750N in the front-back direction D2 is determined by the side surface part 178E and a shaft part of the external thread 175N, and the position of the passive circuit substrate 750N in the left-right direction D1 is determined by fitting the guide part 178Na and the notch part 7508N (in particular, the contact between the guide part 178Na and the notch part 7508N in the left-right direction D1). By removing the external thread 175N from the internal thread 1795N, the holding of the passive circuit substrate 750N by the substrate holder 170N is released.

Thirteenth Embodiment

In the twelfth embodiment, a substrate holder 170P that holds a passive circuit substrate in 750P by another configuration compared to the substrate holder 170N in the twelfth embodiment will be described with reference to FIG. 43 and FIG. 44.

Figure 43:
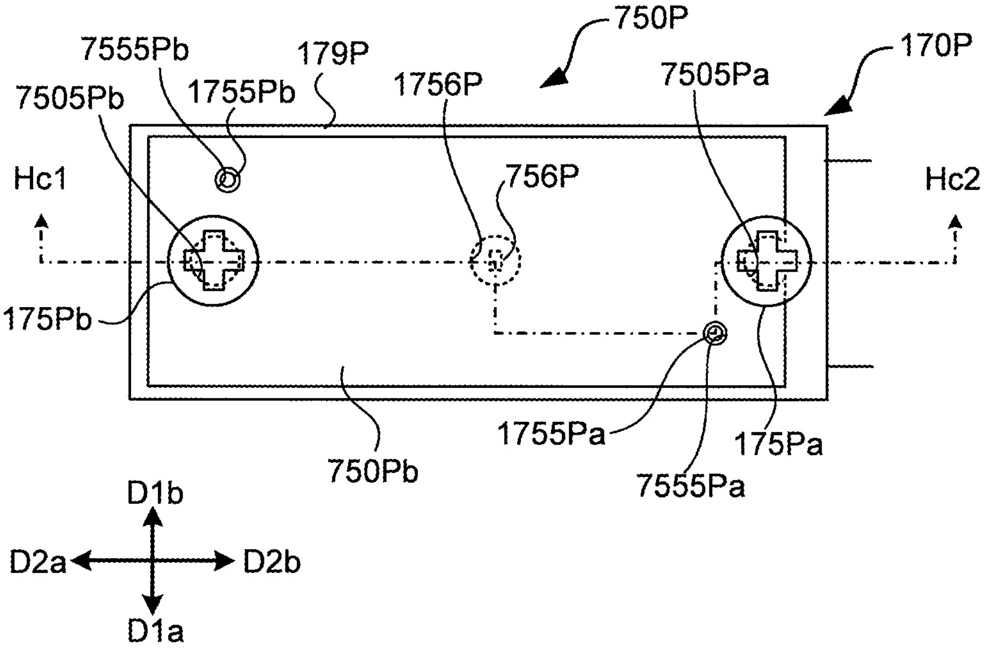
FIG. 43 is a diagram explaining a substrate holder to which a passive circuit substrate is mounted in a thirteenth embodiment of the present disclosure.
Figure 44:
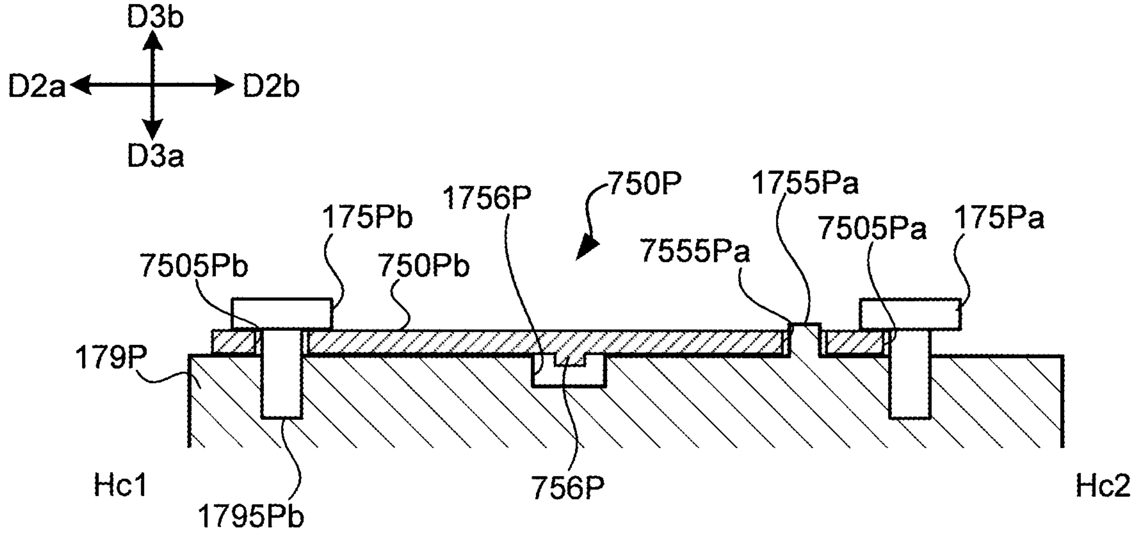
FIG. 44 is a diagram explaining a cross-section (cut line Hc1-Hc2) of a substrate holder in the thirteenth embodiment of the present disclosure.

FIG. 43 is a diagram explaining a substrate holder to which a passive circuit substrate is mounted in the thirteenth embodiment of the present disclosure. FIG. 44 is a diagram explaining a cross-section (cut line Hc1-Hc2) of a substrate holder in the thirteenth embodiment of the present disclosure. The substrate holder 170P is arranged below the key connecting portion 301.

An external thread 175Pb and an internal thread 1795Pb in the substrate holder 170P correspond to the external thread 175N and the internal thread 1795N in the substrate holder 170N, respectively. An opening 7505Pb in the passive circuit substrate 750P mounted to the substrate holder 170P corresponds to the opening 7505N in the passive circuit substrate 750N.

The substrate holder 170P has an external thread 175Pa and an internal thread 1795Pa instead of the substrate holder 170N having the side surface part 178N, the cover part 173N, and the guide part 178Na. The passive circuit substrate 750P has an opening 7505Pa instead of the passive circuit substrate 750N having the notch part 7508N. In this example, the substrate holder 170P has protrusion parts 1755Pa and 1755Pb protruding downward from a bottom surface portion 179P. The passive circuit substrate 750P has openings 7555Pa and 7555Pb into which the protrusion parts 1755Pa and 1755Pb are inserted.

In this example, the opening 7505Pa has a configuration in which a part of the opening 7505Pa reaches the end portion of the passive circuit substrate 750P and a part of the opening 7505Pa is not surrounded by the passive circuit substrate 750P. However, the opening 7505Pa may be formed at a position where it is entirely surrounded. If a part of the opening 7505Pa is not surrounded by the passive circuit substrate 750P, the size of the portion which is not surrounded is preferably smaller than the diameter of the shaft of the external thread 175Pa, that is, the shaft of the external thread 175Pa preferably cannot pass through from the inside to the outside of the opening 7505Pa.

In the case where the external thread 175Pa is fastened to the internal thread 1795Pa and the external thread 175Pb is fastened to the internal thread 1795Pb, the external threads 175Pa and 175Pb pass through the openings 7505Pa and 7505Pb, respectively, and the head parts of the external threads 175Pa and 175Pb contact a surface 750Pb of the passive circuit substrate 750P, respectively. The protrusion parts 1755Pa, 1755Pb pass through the openings 7555Pa, 7555Pb, respectively. The protrusion part 1755Pa does not need to penetrate the opening 7555Pa as long as it can be inserted into the opening 7555Pa. The same structure is applied to the protrusion part 1755Pb.

In this state, the passive circuit substrate 750P is sandwiched between the head parts of the external threads 175Pa, 175Pb and the bottom surface portion 179P to determine the position of the passive circuit substrate 750P in the vertical direction D3, and the protrusion parts 1755Pa and 1755Pb determine the position of the passive circuit substrate 750P in the left-right direction D1 and the front-back direction D2. In the absence of the protrusion parts 1755Pa and 1755Pb, the passive circuit substrate 750P may be positioned in the left-right direction D1 and the front-back direction D2 by the shaft part of the external threads 175Pa and the shaft part of the 175Pb. The positions in the left-right direction D1 and the front-back direction D2 may be determined by two configurations of the protrusion parts 1755Pa, 1755Pb and the external threads 175Pa, 175Pb. In order to determine the position in the vertical direction D3, at least one of the external threads 175Pa, 175Pb may be present.

By removing the external thread 175Pa from the internal thread 1795Pa and the external thread 175Pb from the internal thread 1795Pb, the retention of the passive circuit substrate 750P by the substrate holder 170P is released.

In this example, a concave part 1756P is further formed on the bottom surface portion 179P. The concave part 1756P is formed at a position corresponding to the capacitor 756P of the passive circuit substrate 750P. Therefore, a part of the capacitor 756P can be housed in the region of the concave part 1756P even if the passive circuit substrate 750P is arranged so that the capacitor 756P faces the bottom surface portion 179P. This configuration prevents physical interference with the capacitor 756P from other constructions.

<Modifications>

While an embodiment of the present disclosure has been described above, an embodiment of the present disclosure may be modified into various forms as follows. Also, the embodiments described above and the modifications described below can be applied in combination with each other. Further, it is possible to add, delete, or replace another configuration with respect to a part of the configuration of each embodiment. In the following description, although an example of modifying the first embodiment will be described unless otherwise specified, other embodiments may also be applied as a modified example.

(1) Although the passive coil 751 is provided in the passive circuit substrate 750, a metal plate may be provided instead of the passive coil 751. Even with this configuration, modulation of the output signal of the active circuit 770 by the eddy current generated in the metal plate as in the passive coil 751 can be realized. That is, the passive circuit substrate 750 can include, instead of the coil, a conductor such as a metal plate or the like capable of absorbing energy through a magnetic field. In other words, the conductive circuit in the passive circuit substrate can comprise the metal plate or the passive coil.

(2) In the first embodiment, the active coil 701 is arranged on the frame 20 side, the passive coil 751 is held by the substrate holder 170 and arranged on the key 10 side. Since the passive coil 751 does not require a power supply or the like, although it is easy to design a structure where it is provided on the structure having a movable portion, it is also possible to be arranged in the reverse relationship. That is, the active coil 701 may be arranged on the key 10 side and the passive coil 751 may be arranged on the frame 20 side. In this case, the configuration for performing power supply or the like in the substrate holder 170 may be arranged.

(3) Although the distance between the active coil 701 and the passive coil 751 is closer when a key is depressed than when a key is released, it may be closer when a key is released. This configuration may be realized via a member interlocking with the key 10, or the active circuit substrate 700 may be arranged on the upper surface side of the key 10.

(4) Although one set of the active circuit 770 and the passive circuit substrate 750 has been provided for each key 10, a plurality of sets may be provided for each key 10. For example, the amount of movement of a plurality of member may be measured by a sensor for measuring the pressing amount of the key 10 as in the first embodiment and a sensor for measuring the amount of movement of the member interlocking with the key 10 as in the sixth embodiment. Also, the key 10 may be provided with a plurality of sensors. In this case, a range where the pressing amount can be measured may be different in each sensor. Also, information about the sound generation timing and the key pressing speed may be generated based on a sensor provided in the loaded part 30, and information about the sound cancellation timing may be generated based on the sensor provided in the key 10.

(5) The coil shape of the active coil 701 may take various forms other than the various forms described above. Also, the active coil 701 may be implemented using a plurality of coils. The same configuration is applied to the passive coil 751. Various forms can be applied to the active coil 701 and the passive coil 751 as long as they have configurations that form a magnetic field in the active coil 701 and cause anti-resonance in the active circuit 770 via the magnetic field in the passive coil 751.

(6) Although the active circuit substrate 700 is arranged in the frame 20 (the substrate holding portion 207) that is not interlocked with the key 10, if the positional relationship between the active circuit substrate 700 and the passive circuit substrate 750 when a key is released is different from the positional relationship when a key is depressed, the active circuit substrate 700 may be arranged in the member that is interlocked with the key 10.

(7) Although the fixing member 190 for fixing the substrate holder 170 to the key 10 or the member interlocking with the key 10 may be a screw, a combination of a bolt and nut, double-sided tape, an adhesive, a tucker, a nailer, or a hot bond, and may be of a variety of materials and forms, it is desired to be a material having a relative permeability close to 1 or an insulating material such as a resin to reduce any influence on the magnetic field. Also, if the key 10 is made of wood or some other elastic material, such as certain resins, the substrate holder 170 and the key 10 may be fixed by press-fitting using a dowel or the like. Also, the passive circuit substrate 750 may be directly fixed to the key 10 or the member interlocking with the key 10 by a fixing member without using the substrate holder 170. Even in this case, although the fixing member may be double-sided tape, an adhesive, a tacker, a nailer, a hot bond, and may be of a variety of materials and forms, it is desired to be a material having a relative permeability close to 1 or an insulating material such as a resin to reduce any influence on the magnetic field.

(8) The passive circuit substrate 750 and the active circuit substrate 700 have a positional relationship in which both surfaces are substantially opposite to each other, and the distance between them changes due to the coil provided on both surfaces approaching or away from each other in the vertical direction D3 by an operation on the key 10. The keypress amount measuring unit 70 functions as a distance sensor by outputting a signal corresponding to the distance. On the other hand, even when both surfaces are arranged substantially perpendicular to the operation surface of the key 10, the keypress amount measuring unit 70 can function as a distance sensor in the same manner. For example, it is assumed that both surfaces of the passive circuit substrate 75 and the active circuit substrate 700 are arranged so as to have the normal line along the left-right direction D1. In this case, the distance between the passive circuit substrate 750 and the active circuit substrate 700 changes with the depression of the key 10, and the area where both surfaces overlap changes when viewed along the left-right direction D1. Since the output signal from the active circuit substrate 700 is also changed in accordance with a change of the area, the keypress amount measuring unit 70 can function as a distance sensor.

(9) In the embodiment described above, although the configuration in which the electronic keyboard instrument has the speaker 60 and the sound source unit 80, and the configuration in which the electronic keyboard instrument has a sound generation mechanism such as a string as an acoustic piano such as a grand piano and an upright piano, the speaker 60 and the sound source unit 80 may be omitted from the electronic keyboard instrument. In this case, the keypress amount measuring unit 70 is used to record a performance content of the keyboard or output a performance signal to the outside.

As will be understood from the above description, the present disclosure is also identified as an apparatus (a performance operation apparatus) that controls sound generation by outputting an operation signal corresponding to the performance operation to the sound source unit 80 or the sound generation mechanism. As exemplified in the embodiments described above, although the performance operation apparatus includes an instrument (the keyboard apparatus 1) having the sound source unit 80 for outputting a sound signal and an instrument having a sound generation mechanism, in addition to these instruments, the performance operation apparatus may include an apparatus (e.g., MIDI controller) that does not output a sound signal and an apparatus (e.g., a pedaling mechanism) that does not generate sound itself. In this case, the key and pedal are specified as operating elements for the performance operation. As described above, the performance operation apparatus includes an apparatus that controls the generation of sound and the generation mode of the sound to be changed and outputs a sound signal according to the operation of the operating element by the player (user) with the hand or foot.

When applied to a pedal mechanism, the structure is such that the substrate holder 170 is fixed to the pedal as an operating element, the passive circuit substrate 750 held by the substrate holder 170 and the active circuit substrate 700 provided in the support portion that operably supports the pedal face each other, and the distance (positional relationship) between the passive circuit substrate 750 and the active circuit substrate 700 is changed by the operation of the pedal, so as to be able to detect the operation.

According to an embodiment of the present disclosure, it is possible to facilitate a manufacturing process of a performance operation apparatus using a magnetic induction type sensor.

What is claimed is:

1. A musical performance operation apparatus comprising:
- a distance sensor including:
  - a first substrate including:
    - a surface;
    - a conductor disposed on the surface and forming a first conductive circuit; and
    - at least one of a notch portion or an opening extending through the surface; and
  - a second substrate including a second conductive circuit spaced from the first conductive circuit,
  - wherein the distance sensor is configured to measure a distance between the first substrate and the second substrate;
- an operating element operable by a user; and
- a holding portion holding the first substrate between the operating element and the second substrate and configured to move together with the operating element,
- wherein part of the holding portion extends into the at least one of the notch portion or the opening.

2. The musical performance operation apparatus according to claim 1, wherein a material of the operating element is the same as a material of the holding portion.

3. The musical performance operation apparatus according to claim 1, wherein the holding portion detachably holds the first substrate.

4. The musical performance operation apparatus according to claim 3, wherein:
- the holding portion includes an elastic body,
- in a first state of the elastic body, the holding portion holds the first substrate,
- in a second state of the elastic body, the holding portion releases the first substrate, and
- the elastic body in the second state is more elastically deformed than the elastic body in the first state.

5. The musical performance operation apparatus according to claim 1, wherein:
- the musical performance operation apparatus is a keyboard instrument with a plurality of keys, and
- the operating element is one of the plurality of keys.

6. A musical performance operation apparatus comprising:
- a distance sensor including:
  - a first substrate including a first conductive circuit; and
  - a second substrate including a second conductive circuit spaced from the first conductive circuit,
  - wherein the distance sensor is configured to measure a distance between the first substrate and the second substrate;
- an operating element operable by a user; and
- a holding portion detachably holding the first substrate between the operating element and the second substrate and configured to move together with the operating element,
- wherein the holding portion includes a first plate portion and a second plate portion,
- wherein a position of the first plate portion and a position of the second plate portion are changeable,
- wherein in a first state of the holding portion, where the first plate portion and the second plate portion sandwich the first substrate, the holding portion holds the first substrate, and
- wherein in a second state of the holding portion, where the first plate portion and the second plate portion are further apart than in the first state, the holding portion releases the first substrate.

7. A musical performance operation apparatus comprising:
- a distance sensor including:
  - a first substrate including:
    - a surface;
    - a conductor disposed on the surface and forming a first conductive circuit; and
    - at least one of a notch portion or an opening extending through the surface; and
  - a second substrate including a second conductive circuit spaced from the first conductive circuit,
  - wherein the distance sensor is configured to measure a distance between the first substrate and the second substrate;
- an operating element operable by a user;
- a first member interlocked with the operating element; and
- a holding portion holding the first substrate between the first member and the second substrate and configured to move together with the first member,
- wherein part of the holding portion extends into the at least one of the notch portion or the opening.

8. The musical performance operation apparatus according to claim 7, wherein a material of the first member is the same as a material of the holding portion.

9. The musical performance operation apparatus according to claim 7, wherein:
- the first member includes a part that is elastically deformable, and the distance between the first substrate and the second substrate varies in accordance with elastically deformation of the first substrate in accordance with a force from the operating element.

10. The musical performance operation apparatus according to claim 7, wherein the holding portion detachably holds the first substrate.

11. The musical performance operation apparatus according to claim 10, wherein:

the holding portion includes an elastic body, in a first state of the elastic body, the holding portion holds the first substrate, in a second state of the elastic body, the holding portion releases the first substrate, and the elastic body in the second state is more elastically deformed than the elastic body in the first state.

12. The musical performance operation apparatus according to claim 7, wherein:

the musical performance operation apparatus is a keyboard instrument with a plurality of keys, and the operating element is one of the plurality of keys.

13. A musical performance operation apparatus comprising:

a distance sensor including:

a first substrate including a first conductive circuit; and a second substrate including a second conductive circuit spaced from the first conductive circuit, wherein the distance sensor is configured to measure a distance between the first substrate and the second substrate;

an operating element operable by a user;

a first member interlocked with the operating element; and a holding portion detachably holding the first substrate between the first member and the second substrate and configured to move together with the first member, wherein the holding portion includes a first plate portion and a second plate portion, wherein a position of the first plate portion and a position of the second plate portion are changeable, wherein in a first state of the holding portion, where the first plate portion and the second plate portion sandwich the first substrate, the holding portion holds the first substrate, and wherein in a second state of the holding portion, where the first plate portion and the second plate portion are further apart than in the first state, the holding portion releases the first substrate.

* * * * *